US012507855B2

(12) United States Patent
Sun et al.

(10) Patent No.: US 12,507,855 B2
(45) Date of Patent: Dec. 30, 2025

(54) CLEANER NOZZLE WITH BRUSH AND REMOVAL MEMBER

(71) Applicant: LG ELECTRONICS INC., Seoul (KR)

(72) Inventors: Changhwa Sun, Seoul (KR); Seungyeop Lee, Seoul (KR); Sangchul Lee, Seoul (KR); Jungmin Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 18/017,199

(22) PCT Filed: Jan. 8, 2021

(86) PCT No.: PCT/KR2021/000242
§ 371 (c)(1),
(2) Date: Jan. 20, 2023

(87) PCT Pub. No.: WO2022/019417
PCT Pub. Date: Jan. 27, 2022

(65) Prior Publication Data
US 2023/0284849 A1 Sep. 14, 2023

(30) Foreign Application Priority Data
Jul. 23, 2020 (KR) ........................ 10-2020-0091867
Jan. 6, 2021 (KR) ........................ 10-2021-0001504

(51) Int. Cl.
*A46B 13/02* (2006.01)
*A46B 13/00* (2006.01)
(Continued)

(52) U.S. Cl.
CPC ............ *A46B 13/02* (2013.01); *A46B 13/001* (2013.01); *A47L 7/0066* (2013.01); *A47L 9/0411* (2013.01);
(Continued)

(58) Field of Classification Search
CPC ....... A46B 13/00; A46B 13/001; A46B 13/02; A46B 2200/3033; B08B 1/12;
(Continued)

(56) References Cited

U.S. PATENT DOCUMENTS 9,220,386 B2 12/2015 Gilbert et al.
2010/0287717 A1 11/2010 Jang et al.
(Continued)

FOREIGN PATENT DOCUMENTS

CN 109199228 1/2019
CN 210673225 6/2020
(Continued)

OTHER PUBLICATIONS

International Search Report dated Apr. 22, 2021 issued in Application No. PCT/KR2021/000242.
(Continued)

*Primary Examiner* — C. A. Rivera
(74) *Attorney, Agent, or Firm* — KED & ASSOCIATES, LLP

(57) ABSTRACT

Disclosed is a cleaner. A cleaner according to an embodiment of the present invention comprises: a brush; and a removal member that is positioned adjacent to the brush. The brush is rotated to collect garbage, such as hair, located on a floor surface. The collected garbage, such as hair, may be pushed by the removal member and separated from the brush. The garbage, such as hair, separated from the brush may pass through a nozzle housing and may then be collected in a dust bin. Therefore, the garbage, such as hair,
(Continued)

attached to the brush can be easily separated and collected without a separate removal process. Accordingly, user convenience can be improved.

24 Claims, 16 Drawing Sheets

(51) Int. Cl.
*A47L 7/00* (2006.01)
*A47L 9/04* (2006.01)
*B08B 1/40* (2024.01)

(52) U.S. Cl.
CPC .......... *A47L 9/0433* (2013.01); *A47L 9/0477* (2013.01); *A47L 9/0488* (2013.01); *B08B 1/40* (2024.01); *A46B 2200/3033* (2013.01); *A47L 2201/00* (2013.01)

(58) Field of Classification Search
CPC ...... A47L 7/066; A47L 9/0427; A47L 9/0433; A47L 2201/00
See application file for complete search history.

(56) References Cited

U.S. PATENT DOCUMENTS

| | | | | |
|---|---|---|---|---|
| 2012/0124762 A1* | 5/2012 | Caligaris | ................ A47L 25/08 427/202 |
| 2018/0184870 A1 | 7/2018 | Moon et al. | |
| 2018/0338654 A1 | 11/2018 | Kelsey | |

FOREIGN PATENT DOCUMENTS

| | | | |
|---|---|---|---|
| JP | H03131217 A * | 6/1991 | |
| JP | 2001-201656 | 7/2001 | |
| JP | 2006-136647 | 6/2006 | |
| JP | 2009-207646 | 9/2009 | |
| JP | 2010-142364 | 7/2010 | |
| JP | 2014-530727 | 11/2014 | |
| JP | 2015-156987 | 9/2015 | |
| JP | 2018-506414 | 3/2018 | |
| JP | 2019-136486 | 8/2019 | |
| KR | 10-2004-0052092 | 6/2004 | |
| KR | 10-2010-0093325 | 8/2010 | |
| KR | 10-2010-0123585 | 11/2010 | |
| KR | 10-2012-0115008 | 10/2012 | |
| KR | 10-1452617 | 10/2014 | |
| KR | 10-1476156 | 12/2014 | |
| KR | 10-1492069 | 2/2015 | |
| KR | 10-1514201 | 4/2015 | |
| KR | 10-2015-0075642 | 7/2015 | |
| KR | 10-2015-0134797 | 12/2015 | |
| KR | 10-2018-0079070 | 7/2018 | |
| KR | 10-2018-0085584 | 7/2018 | |
| KR | 10-1981827 | 5/2019 | |
| KR | 10-2019-0122191 | 10/2019 | |
| KR | 10-2020-0028580 | 3/2020 | |
| KR | 10-2020-0045606 | 5/2020 | |
| TW | 200610517 | 4/2006 | |
| TW | 201628545 | 8/2016 | |
| TW | 201711621 | 4/2017 | |
| TW | 201742588 | 12/2017 | |
| TW | 201806538 | 3/2018 | |
| WO | WO-2019164261 A1 * | 8/2019 | .......... A47L 9/1409 |

OTHER PUBLICATIONS

Taiwanese Office Action dated Dec. 27, 2021 issued in Application No. 110106358.
International Search Report dated Aug. 6, 2021 issued in Application No. PCT/KR2020/017082.
Taiwan Notice of Allowance dated Apr. 6, 2022 issued in Application No. 109143289.
International Search Report dated Mar. 18, 2021 issued in Application No. PCT/KR2020/017075.
Korean Office Action dated Jul. 26, 2021 issued in Application No. 10-2020-0091871.
Taiwan Office Action dated Dec. 27, 2021 issued in Application No. 109146057.
International Search Report dated Mar. 18, 2021 issued in Application No. PCT/KR2020/017729.
Korean Office Action dated Jul. 26, 2021 issued in Application No. 10-2020-0091868.
Taiwan Office Action dated Mar. 28, 2022 issued in Application No. 109143290.

* cited by examiner

CLEANER NOZZLE WITH BRUSH AND REMOVAL MEMBER

CROSS-REFERENCE TO RELATED PATENT APPLICATIONS

This application is a U.S. National Stage Application under 35 U.S.C. § 371 of PCT Application No. PCT/KR2021/000242, filed on Jan. 8, 2021, which claims priority to Korean Patent Application No. 10-2020-0091867 filed on Jul. 23, 2020 and Korean Application No. 10-2021-0001504 filed on Jan. 6, 2021, whose entire disclosures are hereby incorporated by reference.

TECHNICAL FIELD

The present disclosure relates a cleaner, and more specifically to, a cleaner having a structure capable of effectively capturing substances such as hair or fiber that is easily adhered but is not easily separated, and a cleaner including the same.

BACKGROUND ART

A cleaner refers to a device that is driven by a user's manual operation or on its own to perform a cleaning operation. The cleaning operation using a cleaner is generally used because the cleaning effect and user convenience can be improved compared to the case of using a broom or a mop, which is a traditional cleaning tool.

The cleaner may be used both indoors or outdoors. However, the cleaner is generally used indoors rather than outdoors due to issues such as power supply and hygiene thereof.

The cleaner may be classified into a manual cleaner that a user grips and directly manipulates, and a robot cleaner that is driven on its own to perform a cleaning operation by itself.

In the case of a manual cleaner, a user moves the cleaner directly to perform a cleaning operation. Therefore, one of the characteristics of the manual vacuum cleaner is its light weight and mobility.

In the case of an automatic robot cleaner, it is also characterized by light weight and mobility for the purpose of minimizing power required to be driven on its own.

Light weight depends not only on the material from which the cleaner is manufactured, but also on its size and volume. Here, when the cleaner is excessively downsized in consideration of light weight, it is difficult to provide a dust bin having a sufficient capacity to store dust or trash collected while performing a cleaning operation.

Therefore, a general cleaner is manufactured in a direction that pursues light weight while maximizing the amount of dust or trash that can be accommodated therein. In other words, there is a limit in increasing the size and volume of the cleaner.

With the trend of decreasing the number of members constituting households, such as single-person households, households with companion animals are increasing. By the way, companion animals have more hair that falls out more easily than humans. Hair of Companion animals is generally larger in volume, lighter, and longer than ordinary dust or small trash.

When a cleaning operation is performed in an environment where companion animals are kept, trash collected by the cleaner includes hair of companion animals. Furthermore, body hair that has been removed from the body of the user and persons living together may also be included in the trash collected by the cleaner.

The above-described trash such as hair, fiber strands, or companion animal hair has a property of being easily adhered to an object having a rough surface by electrostatic attraction. At the same time, the trash has a property of not being easily separated from a surface of the adhered object.

Therefore, when the trash adheres to a surface of an object made of a fibrous material such as a carpet or a rug, it is not easy to separate it using the cleaner. Even when the trash is captured during housework or while the cleaner drives on a surface such as a carpet or a rug, it is difficult to separate the trash from the robot cleaner.

Accordingly, not only the efficiency of the cleaning operation and the user's convenience are deteriorated, but there is also a concern that the cleaner may malfunction or be damaged by the trash adhered to the cleaner.

Japanese Patent Publication No. 2009-0207646 discloses a manual cleaning tool. Specifically, a manual cleaning tool including a dust collecting body that is manipulated by a user and rotates in one direction to capture dust, and a plurality of brushes that push and remove dust attached to an outer circumference of the dust collecting body is disclosed. Here, the manual cleaning tool denotes a cleaning tool that is operated only with a force applied by a user without using separate power.

However, this type of manual cleaning tool is operated in such a way that dust is captured only when it is rotated in one direction, and the collected dust is removed only when it is rotated in a direction opposite thereto. In other words, the prior document does not propose a method for capturing dust and removing the captured dust regardless of rotation direction.

Furthermore, in the prior document, only the dust collecting body is rotated, and the plurality of brushes are not separately rotated. Accordingly, there is a limit in that the captured dust is removed only when the dust collecting body is moved toward the plurality of brushes.

Moreover, the dust collecting body of the prior document may collect dust only when a user applies a force to manipulate it. The prior document discloses only a mechanism for capturing dust already collected in a dust bin. In other words, the prior document does not propose a method of automatically collecting dust without a user's external force or removing dust sporadically adhered to a nozzle part.

Chinese Patent Publication No. 109199228 discloses a dust collector. Specifically, a dust collector having a structure provided with a hair device and a razor detachably coupled to a housing so as to remove collected hair or the like adhered to a cylindrical brush is disclosed.

However, in this type of dust collector, the function may be implemented only when the hair device and the razor are separately provided and combined together. In other words, depending on the state of use, there is an inconvenience of storing and installing the hair device and the razor separately.

Furthermore, the hair device and the razor disclosed in the prior document are coupled to the housing until they come into contact with the cylindrical brush. Therefore, there is a concern that the cylindrical brush itself may be damaged by the hair device or the razor due to a user's unskilled operation or the use progresses.

U.S. Pat. No. 9,220,386 discloses a robot cleaner. Specifically, a robot cleaner having a structure capable of collecting trash existing on the ground using a plurality of rollers is disclosed.

However, this type of robot cleaner has a limitation in that an actuator for operating each roller must be provided. Accordingly, there is a concern that not only an amount of power required to operate the robot cleaner increases, but also an overall size of the robot cleaner increases.

In addition, the robot cleaner disclosed in the prior document has a structure in which a thrust in a direction toward the top is applied to trash caught between brushes provided in each roller. Accordingly, the purpose may be achieved only when the roller rotated by an exact angle as intended.

In other words, depending on the environment in which the robot cleaner disclosed in the prior document is operated, there is a concern that the purpose may not be achieved.

Korean Patent No. 10-1981827 discloses a cleaning device for a nozzle of a vacuum cleaner. More specifically, it discloses a cleaning device for a nozzle of a vacuum cleaner including a socket for accommodating a vacuum cleaner nozzle, and a cleaning member disposed in the socket to remove articles entangled therewith while a rotatable member rotates.

However, the cleaning device for the nozzle of this type of vacuum cleaner is disposed in a charging stand for charging the vacuum cleaner. Accordingly, there is an inconvenience in that the user must place the vacuum cleaner on the charging stand and then operate the vacuum cleaner again after completing the use of the vacuum cleaner.

Korean Patent Publication No. 10-2020-0028580 discloses a pet comb capable of sucking and removing hair and a vacuum cleaner including the same. Specifically, it discloses a pet comb including a roll comb part that combs the hair of a pet inside a body case and a rake part that removes hair stuck in the roll comb portion and a vacuum cleaner including the same.

However, this type of pet comb and a vacuum cleaner including the same have a limitation in that they are applicable only to a handy type cleaner other than a robot cleaner or a large cleaner due to their use.

In addition, since both the roll comb part and the rake part are provided in a rake shape, there is also a limitation that it is difficult to remove hair tangled in each rake.

Japanese Patent Publication No. 2009-207646 (Sep. 17, 2009)

Chinese Patent Publication No. 109199228 (Jan. 15, 2019)

U.S. Pat. No. 9,220,386 (Dec. 29, 2015)

Korean Patent No. 10-1981827 (May 23, 2019)

Korean Patent Publication No. 10-2020-0028580 (Mar. 17, 2020)

DISCLOSURE OF INVENTION

Technical Problem

An aspect of the present disclosure is to provide a cleaner having a structure capable of solving the foregoing problems.

First, an aspect of the present disclosure is to provide a cleaner having a structure capable of easily collecting trash in the form of hair or fiber scattered indoors.

Furthermore, an aspect of the present disclosure to provide a cleaner having a structure capable of easily separating and capturing trash in the form of hair or fiber.

Furthermore, an aspect of the present disclosure is to provide a nozzle part having a structure capable of easily discharging the trash in the form of hair or fiber.

Furthermore, an aspect of the present disclosure is to provide a cleaner having a structure capable of minimizing the number of components that provide power to a member for achieving the above object.

Furthermore, an aspect of the present disclosure is to provide a nozzle part having a structure capable of simplifying the structure of the member for achieving the above object.

Furthermore, an aspect of the present disclosure is to provide a cleaner having a structure capable of downsizing as well as achieving the above object.

Furthermore, an aspect of the present disclosure is to provide a cleaner having a structure that is applicable to other types of cleaners as well as achieving the above object.

Solution to Problem

In order to achieve the above objectives, the present disclosure provides a cleaner having the following structure.

First, the cleaner is provided with a nozzle housing that communicates with a dust bin thereinside. The nozzle housing includes a frame forming an appearance and a brush rotatably provided in the frame.

The brush is rotated in a clockwise or counterclockwise direction. Part of the brush is partially exposed to an outside of the nozzle housing to come into contact with trash such as trash such as hair located on the ground or floor surface.

An adhesive member is provided on an outer circumference of the brush. The adhesive member is formed of a material having high roughness and high friction. As the brush is rotated, trash such as hair located on the floor surface adheres to the adhesive member.

A removal member is provided in the nozzle part. The removal member separates trash such as hair adhered to the adhesive member from the adhesive member. Trash such as separated hair flows into the dust bin of the cleaner through the nozzle housing.

In one embodiment, the removal member is located adjacent to the adhesive member. In other words, the removal member may be in contact with the adhesive member or disposed to be spaced apart by a minute distance. The removal member presses trash such as hair adhered to the adhesive member to separate it from the adhesive member.

In one embodiment, the release member is rotated. Specifically, the removal member may reciprocate by a predetermined distance along an outer circumference of the adhesive member. In other words, the removal member is rotated in a clockwise and counterclockwise direction in an outer circumferential direction of the adhesive member from a radial outer side of the adhesive member.

A member made of the same material as the adhesive member is provided on one surface of the removal member facing the adhesive member, that is, an inner surface of an extension part. In other words, a member made of a material having high roughness and high friction is provided on an inner surface of the removal member. The member may be in contact with the adhesive member or spaced apart by a minute distance. In any case, the member may come into contact with trash such as hair or the like adhered to the adhesive member.

The adhesive member may have orientation. In other words, between a direction in which the brush is rotated and a direction opposite thereto, the adhesive member may have a smoother inclination in either one direction than in the other direction.

Likewise, the member provided on the inner surface of the removal member may also have orientation. In other words, between a direction in which the brush is rotated and a direction opposite thereto, the member may have a smoother inclination in either one direction than in the other direction.

In various embodiments, the orientation of the adhesive member and the orientation of the member provided on an inner surface of the removal member may be combined in various ways.

The brush is rotated by a power part. The power part may be disposed at one or more of end portions in an axial direction, which is a direction in which the brush extends.

A main gear is connected to the brush. When the power part is operated, the main gear may rotate together with the brush. In one embodiment, the main gear may be disposed to surround an outer circumference of the end portion of the brush.

The main gear is gear-fitted to the sub-gear. When the main gear is rotated, the sub-gear may also be rotated. At this time, a gear ratio between the main gear and the sub-gear may be adjusted to more quickly adjust the rotation speed of the sub-gear.

The sub-gear is connected to the link part. The link part links the sub-gear and the removal member. The rotation of the sub-gear is converted into a reciprocating motion of the removal member through the link part. In this case, the link part includes a main link coupled to the removal member, and a sub-link coupled to the main link and the sub-gear, respectively.

The large-small relationship of the relative lengths of the main link and the sub-link may be adjusted to adjust the movement speed among the main gear, the sub-gear and the removal member.

As described above, the sub-gear rotates faster than the main gear. Therefore, when the power part is operated, the removal member may reciprocate at a faster speed than the brush.

In other words, the brush and the removal member may be rotated by a single power part.

In one embodiment, the removal member is disposed to partially cover an outer circumference of the brush. When viewed in a cross-sectional direction, the removal member may be defined in an arc shape surrounding the outer circumference of the brush.

The removal member revolves along an outer circumference of the brush. The central axis of revolution of the removal member may be coaxial with the rotation axis of the brush. At this time, the removal member revolves without rotation. In other words, the inner surface of the removal member facing the brush is kept constant.

As described above, the removal member moves in one of a clockwise direction and a counterclockwise direction by a predetermined distance along an outer circumference of the brush, and then returns again to the other direction. At this time, the removal member revolves on the remaining portion of the brush other than a portion exposed to the outside.

In other words, the removal member is not exposed to an outside of the nozzle housing. To put another way, the removal member is not in direct contact with the floor surface.

The removal member revolves faster than the rotational speed of the brush. In other words, the time required for the removal member to rotate by a predetermined angle is shorter than the time required for the brush to rotate by the same angle.

In one embodiment, the removal member may be coupled to the brush at a plurality of points. In the above embodiment, the main gear coupled to the brush may be provided in plural, and may be provided at each end portion in a direction in which the brush extends. In addition, the sub-gear link-coupled to the removal member may be provided in plural, and may be gear-fitted to the main gear at each end portion in a direction in which the brush extends.

In the above embodiment, link parts are also provided, and link-coupled to a plurality of sub-gears, respectively. In other words, the removal member is coupled to the brush by a plurality of link parts. Even in this case, since the brush is rotated by a single power part, a plurality of main gears, sub-gears and link parts may also be operated by a single power part.

Advantageous Effects of Invention

According to an embodiment of the present disclosure, the following effects may be achieved.

First, a brush is provided in a nozzle part. The brush is extended in one direction, and an adhesive member formed of a material such as felt having a high roughness is provided on an outer circumference thereof. In other words, the adhesive member constitutes an outer circumferential surface of the brush. The brush is partially exposed to an outside of a nozzle housing.

When the cleaner is operated, the adhesive member rolls along a floor surface to be cleaned. The adhesive member is formed of a material having high roughness and high friction. Due to the material of the adhesive member and the characteristics of its shape, trash such as hair staying on the floor surface is easily adhered to the adhesive member.

Accordingly, trash such as hair existing in a region where the cleaner has passed while being driven may be easily collected.

Furthermore, a removal member is provided in the nozzle part. The removal member is positioned adjacent to the brush to revolve with respect to the brush. A member made of the same material as the adhesive member surrounding an outer circumference of the brush is provided on an inner surface, which is a surface of the removal member facing the brush. The member may be in contact with the adhesive member or spaced apart by a minute distance to press trash such as hair adhered to the adhesive member.

At this time, the removal member is rotated at a faster speed than the brush, and alternately faces clockwise and counterclockwise directions to reciprocate by a predetermined distance. As a result, even when the brush is rotated in either one direction between clockwise and counterclockwise directions, the removal member may effectively press and remove trash such as hair adhered to the adhesive member.

The removal member is disposed to partially surround an outer circumference of the brush. At this time, the removal member may be located to be spaced apart from an outer circumference of the brush by a predetermined distance. Trash such as hair adhered to an outer circumference of the brush, that is, the adhesive member, passes through a space generated by the separation and then is pressed by the removal member. Accordingly, trash such as hair adhered to the adhesive member may be dropped into an inner space of the nozzle housing in which the brush is accommodated.

Accordingly, the collected trash such as hair may be easily collected in a dust bin through an inner space of the nozzle housing and body part without any additional operation.

In one embodiment, the adhesive member may have a lower slope along either one of a clockwise direction and a counterclockwise direction than that along the other one.

Likewise, a member provided on an inner surface of the removal member may also have a lower slope along either one of a clockwise direction and a counterclockwise direction than that along the other one.

In other words, directions having a lower slope of the member provided on the inner surface of the removal member and the adhesive member may be the same or different directions. Accordingly, various combinations are possible depending on whether the cleaner is moving forward or backward, the environment in which the cleaner is used, and the purpose of the cleaning operation.

As a result, trash such as hair remaining in the environment where the cleaner is used may be easily captured. In addition, trash such as captured (i.e., adhered) hair may be easily separated from the brush and introduced into the dust bin.

Furthermore, the dust bin is detachably coupled to the body part. An inner space of the dust bin communicates with an inner space of the body part. Through the foregoing process, trash such as hair scattered on the floor surface is collected and then moved and accommodated in the dust bin.

Accordingly, a user may separate only the dust bin to easily discharge the collected trash such as hair.

Furthermore, a single power part is coupled to the brush. When the power part is operated, the brush rotates (i.e., revolves) in either one of a clockwise direction and a counterclockwise direction.

In addition, the brush is provided with a main gear. When the brush is rotated, the main gear is also rotated.

The main gear is gear-fitted to the sub-gear located at a radial outer side of the brush. When the brush and main gear are rotated, the sub-gear is also rotated.

The removal member is link-coupled to the sub-gear by a link part. When the sub-gear is rotated, due to the link movement of the link part, the removal member revolves and reciprocates at a radial outer side of the brush.

In other words, when a single power part is operated, the brush and the main gear are rotated together. Furthermore, the sub-gear coupled to the main gear and the link part connected thereto are also rotated. By a link movement of the link part, the removal member is alternately moved to reciprocate in clockwise and counterclockwise directions.

Therefore, when the brush is rotated by a single power part, the removal member may also be rotated by various couplings. As a result, the number of power sources required to rotate the brush and the removal member may be minimized.

Accordingly, as the removal member and the brush are positioned adjacent to each other, a space occupied by the removal member and the brush may be minimized. In addition, since the removal member and the brush are coupled by the gear part and the link part, a space occupied by a member for coupling the removal member and the brush is also minimized.

Furthermore, the brush, the removal member, the gear part and the link part may all be operated by a single power part.

Accordingly, the size of an entire space occupied by a member for collecting trash such as hair and sending it to the dust bin for accommodation is reduced. As a result, a structure of the nozzle housing to which the nozzle part is coupled and the cleaner to which the nozzle housing is coupled may be simplified, and an overall size of the cleaner may be reduced.

In addition, the nozzle housing accommodating the nozzle part is detachably coupled to the body part. In other words, the cleaner may perform a normal cleaning operation by manipulating the body portion without being coupled to the nozzle housing.

When trash such as hair remains in an area to be cleaned, the user may couple the nozzle housing to the body of the cleaner to perform the cleaning operation. Accordingly, the nozzle part and the nozzle housing may be provided in the cleaner as necessary, thereby improving user convenience and efficiency of cleaning operation.

As the nozzle part and the nozzle housing are detachably provided in the body part, the user may separate only the nozzle part and the nozzle housing from the body part and couple them to a body part of another cleaner to use.

Accordingly, the user may obtain the effect of the cleaner according to the embodiment of the present disclosure by separately providing the nozzle housing and the nozzle part without purchasing a cleaner including both the nozzle housing and the nozzle part.

As a result, the general use, user convenience and economic efficiency of the nozzle part may be improved.

MODE FOR THE INVENTION

Hereinafter, a nozzle part 60 according to an embodiment of the present disclosure and a cleaner 1 including the same will be described in detail with reference to the accompanying drawings.

In the following description, the description of some components may be omitted to clarify the features of the present disclosure.

1. Definition of Terms

In case where an element is "connected" or "linked" to the other element, it may be directly connected or linked to the other element, but it should be understood that any other element may be existed therebetween.

On the contrary, in case where an element is "directly connected" or "directly linked" to the other element, it should be understood that any other element is not existed therebetween.

Unless clearly used otherwise, a singular expression used in the present disclosure may include a plural expression.

The term "dust" used in the following description refers to fine-sized particles, dust, etc. existing in an environment such as indoors where a cleaner is operated.

The term "small trash" used in the following description refers to trash of a size that is larger than dust but can be collected by the cleaner.

The term "hair" used in the following description refers to a fine thread-like material that has been removed from animals, including humans. The hair may be body hair that has been removed from a human body, hair on the head, or body hair that has been removed from an animal body.

The term "fiber" used in the following description refers to any fine thread-like material except for the hair. In one embodiment, the fiber may be a material that has been removed from clothing, bedding, furniture, and miscellaneous goods.

In the following description, hair and fiber are collectively referred to as "hair (H) or the like."

The term "cleaner" used in the following description refers to a device capable of performing a cleaning operation by being driven and moved by a user's manual operation or on its own.

The cleaner may include a wired cleaner supplied with power through a wire, a wireless cleaner operated in a wireless manner by a battery, or the like. Furthermore, the cleaner may include a robot cleaner that is driven on its own to perform a cleaning operation in a preset manner.

Figure 1:
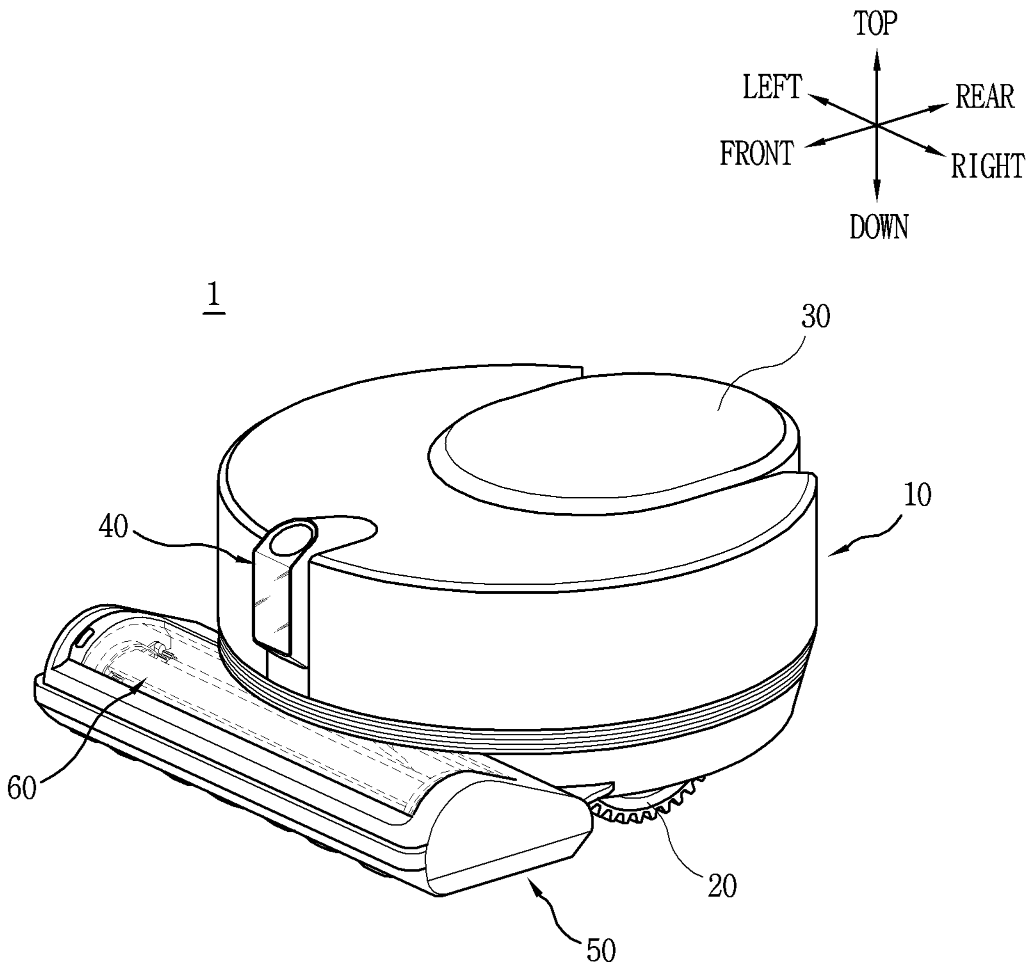
FIG. 1 is a perspective view illustrating a cleaner according to an embodiment of the present disclosure.

The terms "front side", "rear side", "left side", "right side", "top side" and "bottom side" used in the following description will be understood with reference to a coordinate system illustrated in FIG. 1.

Figure 2:
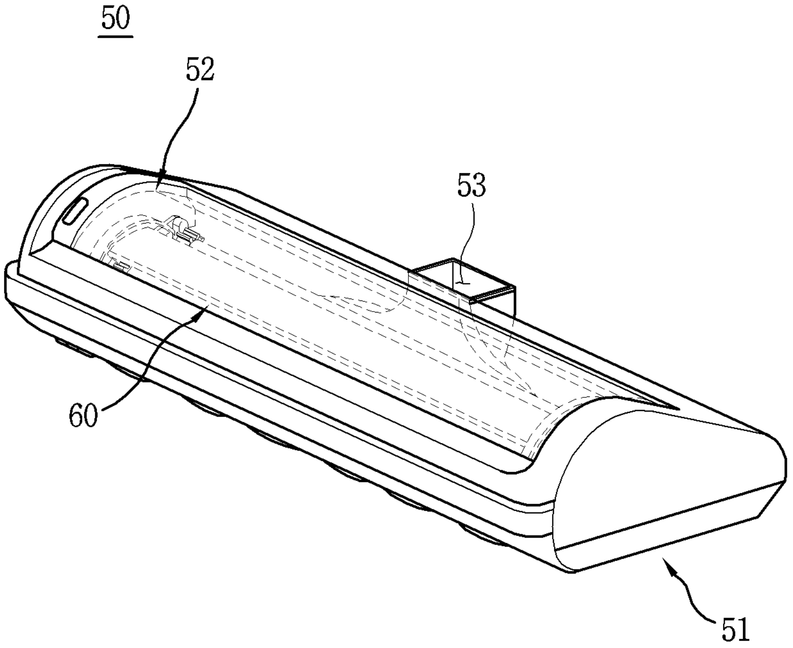
FIG. 2 is a perspective view illustrating a nozzle housing provided in the cleaner of FIG. 1.
Figure 3:
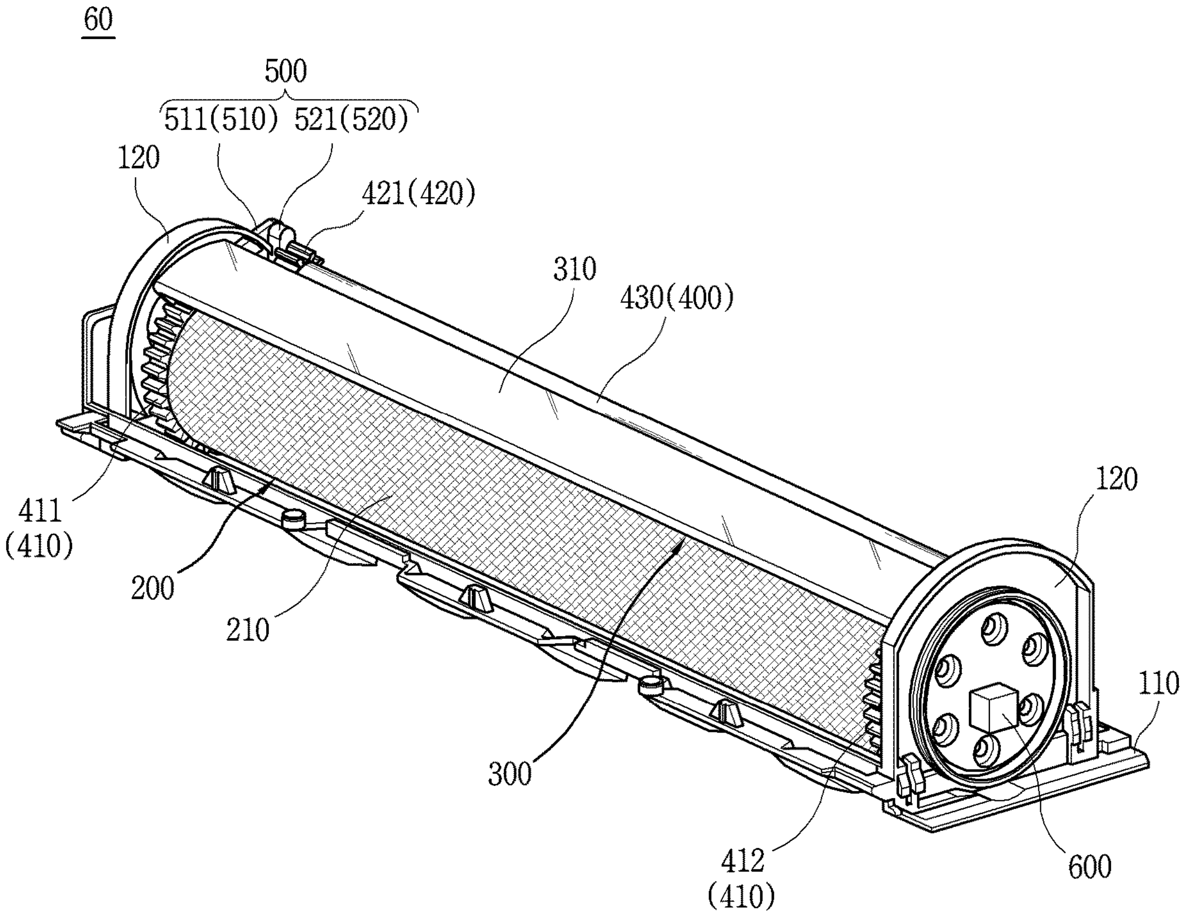
FIG. 3 is a perspective view illustrating a nozzle part accommodated in the nozzle housing of FIG. 2.
Figure 4:
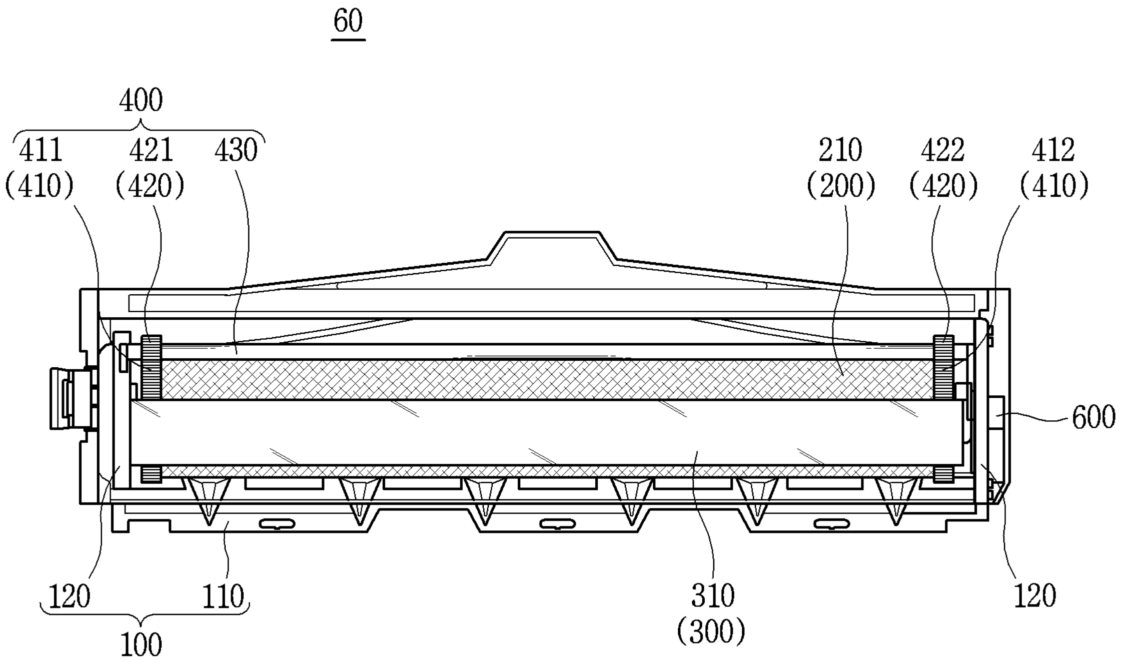
FIG. 4 is a bottom view illustrating the nozzle part of FIG. 3.
Figure 5:
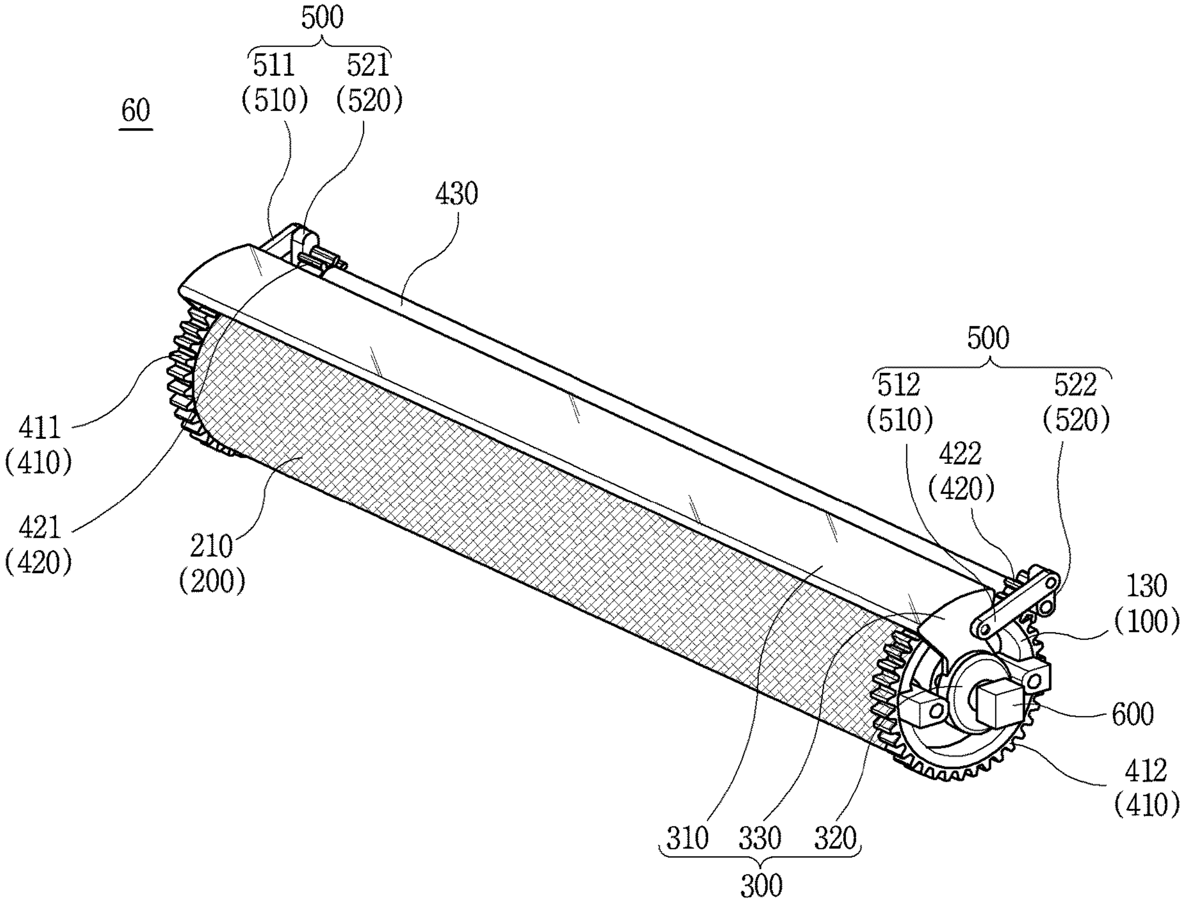
FIG. 5 is a perspective view illustrating a main brush and a removal member provided in the nozzle part of FIG. 3.

2. Description of Configuration of Cleaner 1 According to Embodiment of Present Disclosure Referring to FIGS. 1 and 2, a cleaner 1 according to an embodiment of the present disclosure includes a body part 10, a driving part 20, a dust bin 30, a sensor part 40, a nozzle housing 50, and a nozzle part 60.

Hereinafter, each configuration of the cleaner 1 according to an embodiment of the present disclosure will be described with reference to the accompanying drawings, but the nozzle part 60 will be described as a separate paragraph.

(1) Description of Body Part 10

The body part 10 forms an appearance of the cleaner 1. The body part 10 may accommodate components for the cleaner 1 to perform a cleaning operation in a space accommodated therein.

The body part 10 may collide with various obstacles provided in a region where the cleaner 1 is driven, for example, indoors. Therefore, the body part 10 is preferably formed of a material of high rigidity to prevent damage due to a collision.

In addition, the body part 10 is preferably formed of a lightweight material. This is to reduce power required for the driving of the cleaner 1.

In one embodiment, the body part 10 may be formed of a synthetic resin such as reinforced plastic.

A user interface may be provided outside the body part 10. The user may manipulate the user interface to control the operation of the cleaner 1. Furthermore, the user interface may display information on the cleaner 1 and the state of a region where the cleaner 1 is driven.

An inner space of the body part 10 may communicate with the outside. Air or small trash captured while the cleaner 1 is driven may be introduced into the dust bin 30 that is detachably coupled through an inner space of the body part 10. In addition, air introduced together with dust or small trash may be discharged to an outside of the body part 10.

Various sensors may be provided in the body part 10. In other words, in addition to the sensor part 40 which will be described later, the body part 10 may be provided with a gyro sensor or the like for sensing an inclination of the floor surface (G).

In the illustrated embodiment, the body part 10 has a circular cross section, and is provided in a disk shape having a predetermined height in a vertical direction. Accordingly, when the cleaner 1 collides with various obstacles while being driven, the body part 10 may rotate and drive in various directions.

A nozzle housing 50 and a nozzle part 60 accommodated in the nozzle housing 50 are detachably coupled to the body part 10. An inner space of the nozzle housing 50 may communicate with an inner space of the body part 10 and the dust bin 30.

Accordingly, trash (H) such as hair collected by the nozzle part 60 may be introduced and collected in the dust bin 30 through an inner space of the body part 10.

The driving part 20 is rotatably coupled to a lower side of the body part 10.

The driving part 20 provides power for moving the cleaner 1. In addition, the driving part 20 allows the cleaner 1 to be rotated to change the driving direction.

The driving part 20 is located at a lower side of the cleaner 1. The driving part 20 is rotatably coupled to a lower side of the body part 10.

The driving part 20 may be provided in a form capable of being rotated to move forward or backward. In the illustrated embodiment, the driving part 20 is provided in the form of a wheel.

A plurality of driving parts 20 may be provided. In the illustrated embodiment, the driving part 20 is provided on the left and right sides, respectively, at a lower side of the body part 10. The rotational speed and rotation direction of each driving part 20 positioned on each side may be controlled independently of each other.

Accordingly, the cleaner 1 may move forward, backward, rotate left or right.

Although not shown, the driving part 20 may be coupled to a power device (not shown). The power device (not shown) may be provided in the form of a motor that rotates the driving part 20 by receiving an electric signal.

In one embodiment, a plurality of power devices (not shown) may be provided, and coupled to a plurality of driving parts 20, respectively. Accordingly, the plurality of driving parts 20 may be controlled independently of each other.

The dust bin 30 stores the collected trash while the cleaner 1 is driven. In one embodiment, the dust bin 30 may accommodate trash (H) such as hair.

A predetermined space is defined inside the dust bin 30. The space communicates with a space disposed inside the body part 10. The trash collected through the nozzle part 60 may pass through the space disposed inside the body part 10 to enter an inside of the dust bin 30.

To this end, a member (not shown) for applying a conveying force to the collected trash may be provided in any one or more of the space, the dust bin 30, and the nozzle part 60 disposed inside the body part 10. In one embodiment, the member may be provided in the form of a cyclone.

The dust bin 30 is detachably coupled to the body part 10. The user may release the dust bin 30 from the body part 10 to easily remove trash accommodated in the dust bin 30.

The dust bin 30 may be formed of a transparent material. This is to allow the user to visually recognize an amount of trash accommodated in the dust bin 30 and easily determine the discharge timing of trash.

Alternatively, a sensor (not shown) may be provided in the dust bin 30. In one embodiment, the sensor (not shown) may sense the mass or volume of trash accommodated in an inner space of the dust bin 30. The sensed mass or volume may be transmitted to the user in the form of visualization information or auditory information to allow the user to easily recognize the discharge timing of trash.

The sensor part 40 senses information on a path on which the cleaner 1 is driven.

The sensor part 40 may be located in a direction in which the cleaner 1 is to be driven. In the illustrated embodiment, the sensor part 40 is located at a front side of the body part 10 to sense information about an environment at a front side of the cleaner 1.

The sensor part 40 may be provided in an arbitrary form capable of detecting information on the environment of a path on which the cleaner 1 is driven or to be driven. In the illustrated embodiment, the sensor part 40 is provided as a camera capable of sensing image information.

Although not shown, the sensor part 40 may further include an infrared sensor or the like for sensing a distance to an obstacle.

The nozzle housing 50 is detachably coupled to a lower side of the sensor part 40, that is, at a lower side of the front of the body part 10.

The nozzle housing 50 accommodates the nozzle part 60. As the cleaner 1 is driven, trash collected by the nozzle part 60, particularly, trash (H) such as hair may be introduced into a space inside the body part 10 and the dust bin 30 through the nozzle housing 50.

The nozzle housing 50 is located at a lower side of the front of the body part 10. When the driving part 20 is rotated, a lower side of the nozzle housing 50 may be in contact with the floor surface (G) or spaced apart by a predetermined distance to move together with the body part 10.

A space is defined inside the nozzle housing 50. The nozzle part 60 is accommodated in the space. As will be described later, the nozzle part 60 includes a frame 100, a brush 200 rotatably coupled to the frame 100, and a removal member 300. The brush 200 and the removal member 300 of the nozzle part 60 may be rotated in an inner space of the nozzle housing 50.

The nozzle housing 50 is detachably coupled to the body part 10. When the nozzle housing 50 and the body part 10 are coupled to each other, the inner space of the nozzle housing 50 communicates with the inner space of the body part 10. Accordingly, the inner space of the nozzle housing 50 may communicate with the dust container 30.

The nozzle housing 50 is coupled to the body part 10 and moved together, and may have any shape capable of accommodating the nozzle part 60 therein. In the illustrated embodiment, the nozzle housing 50 has a polygonal columnar shape that extends long in a left-right direction, and protrudes upward with different inclination angles in the front and rear directions.

The nozzle housing 50 may collide with various obstacles provided in a region where the cleaner 1 is driven, for example, indoors. It is because the nozzle housing 50 is coupled to the body part 10 to be exposed to an outside of the body part 10. Therefore, the nozzle housing 50 is preferably formed of a material of high rigidity to prevent damage due to a collision.

Furthermore, the nozzle housing 50 is preferably formed of a lightweight material. This is to reduce power required for the driving of the cleaner 1.

In one embodiment, the nozzle housing 50 may be formed of a synthetic resin such as reinforced plastic.

In the illustrated embodiment, the nozzle housing 50 includes an outer housing 51, an inner housing 52 and a communication part 53.

The outer housing 51 defines an outer side of the nozzle housing 50. The outer housing 51 is exposed to an outside of the nozzle housing 50.

A predetermined space is defined inside the outer housing 51. The inner housing 52 and the nozzle part 60 accommodated in the inner housing 52 are accommodated in the space. The space communicates with a space disposed inside the body part 10. The communication is achieved by the communication part 53.

The inner housing 52 is located inside the outer housing 51.

The inner housing 52 defines an inner side of the nozzle housing 50. The inner housing 52 is not exposed to the outside.

A space is defined inside the inner housing 52. The nozzle part 60 is accommodated in the space. The brush 200 and the removal member 300 of the nozzle part 60 may be rotated while being accommodated in the inner housing 52.

The nozzle part 52 may be coupled to the inner housing 60. Specifically, the frame 100 of the nozzle part 60 may be coupled to the inner housing 52.

An opening part is disposed at one side of the inner housing 52, at a lower side in the illustrated embodiment. The nozzle part 60 accommodated in the inner housing 52 may be exposed to an outer side of the inner housing 52 through the opening part. Accordingly, when the cleaner 1 is driven, various types of trash placed on the floor surface (G) may be collected by the nozzle part 60.

The space defined inside the inner housing 52 communicates with the communication part 53. Various types of trash collected by the nozzle part 60 may pass through the communication part 53 to be introduced into the inner space of the body part 10 and the dust container 30.

The communication part 53 communicates an inner space of the outer housing 51 and an inner space of the inner housing 52 with an inner space of the body part 10.

The communication part 53 may be located in the outer housing 51. The communication part 53 is located on one side facing the body part 10, at upper side of the rear in the illustrated embodiment.

The communication part 53 may be detachably coupled to the body part 10. By the coupling, the nozzle housing 50 and the body part 10 may be detachably coupled to each other.

3. Description of Nozzle Part 60 According to Embodiment of Present Disclosure Referring back to FIGS. 1 and 2, the cleaner 1 according to an embodiment of the present disclosure includes a nozzle part 60.

The nozzle part 60 is rotated as the cleaner 1 is operated to collect various types of trash located on the floor surface (G) in a region where the nozzle part 60 is exposed.

The nozzle part 60 may be moved together as the cleaner 1 is moved. Accordingly, the nozzle part 60 may collect trash in various regions.

The nozzle part 60 may be accommodated in the nozzle housing 50, and exposed toward the floor surface (G). When the cleaner 1 is driven, the nozzle part 60 is driven while being in contact with the floor surface (G) or being separated by a predetermined distance.

The nozzle part 60 may be rotated. Accordingly, various types of trash located on the floor surface (G) may be collected by the nozzle part 60, and collected in the dust bin 30 through the nozzle housing 50.

In this specification, the description will be made on the premise that the nozzle part 60 is rotated to collect trash (H) such as hair.

(1) Description of Components of Nozzle Part 60

Hereinafter, components of the nozzle part 60 according to an embodiment of the present disclosure will be described in detail with reference to FIGS. 3 through 10.

In the illustrated embodiment, the nozzle part 60 includes a frame 100, a brush 200, a removal member 300, a gear part 400, a link part 500, and a power part 600.

The frame 100 is a portion in which the nozzle part 60 is coupled to the nozzle housing 50. In addition, the frame 100 rotatably supports the brush 200 and the removal member 300.

The frame 100 may be formed of a lightweight and high rigid material. In one embodiment, the frame 100 may be formed of a synthetic resin material such as reinforced plastic.

The frame 100 defines part of the outer shape of the nozzle part 60. In the illustrated embodiment, the frame 100 defines lower, left and right sides of the nozzle part 60.

In the illustrated embodiment, the frame 100 includes a lower frame 110, a side frame 120 and a support frame 130.

The lower frame 110 defines a lower side of the frame 100. The lower frame 110 partially surrounds a lower side of the brush 200.

The lower frame 110 may be defined in a shape corresponding to the shape of the brush 200. In the illustrated embodiment, the brush 200 has a cylindrical shape extending in a left-right direction, and the lower frame 110 may also be provided in a plate shape extending in a left-right direction.

An opening part is disposed inside the lower frame 110. The opening part may be disposed to pass through upper and lower portions of the lower frame 110. Part of the brush 200, in the illustrated embodiment, part of the lower side may be exposed to a lower side of the lower frame 110 through the opening part. Accordingly, the brush 200 may be exposed to an outside of the nozzle housing 50.

Side frames 120 are located at respective end portions in both directions in which the lower frame 110 extends, and at left and right end portions in the illustrated embodiment, respectively.

The side frames 120 define respective end portions in a length direction of the frame 100 and in a left-right direction in the illustrated embodiment. The side frames 120 are coupled to end portions in respective directions in which the brush 200 extends, and to the left and right end portions, respectively, in the illustrated embodiment.

Either one of the side frames 120, the side frame 120 located on the right side in the illustrated embodiment, may have a through hole formed in the length direction. A power part 600 for rotating the gear part 400 may be coupled to the through hole to pass therethrough.

The brush 200 and the removal member 300 are rotatably coupled to the side frame 120. In other words, the side frame 120 is not rotated irrespective of the rotation of the brush 200 and the removal member 300. The coupling may be achieved by coupling the support frame 130 to the side frame 120.

The side frame 120 may be defined in a shape corresponding to the shape of the inner space of the nozzle housing 50. In the illustrated embodiment, the side frame 120 is provided in a plate shape in which an upper end portion thereof is defined to be rounded in a convex manner toward the upper side.

The support frame 130 rotatably couples the brush 200 to the side frame 120.

A plurality of support frames 130 may be provided. The plurality of support frames 130 may be coupled to the brush 200 and each side frame 120 in a direction in which the brush 200 extends, and in a left-right direction in the illustrated embodiment. The support frame 130 is located between the brush 200 and the side frame 120.

The support frame 130 may be coupled to the brush 200. In the illustrated embodiment, the support frame 130 may be located in a direction in which the brush 200 extends, that is, at left and right end portions, respectively.

A through part is disposed in the center of the support frame 130. Through the through portion, the brush 200 and the power part 600 may be coupled to each other. Accordingly, when the power part 600 is operated, the brush 200 connected thereto is rotated, but the support frame 130 is not rotated.

The detailed description of the rotation process will be described later.

The brush 200 is rotated to collect various types of trash staying on the floor surface (G).

The brush 200 is rotatably coupled to the frame 100. Specifically, both end portions of the brush 200 are rotatably supported by a plurality of side frames 120. The coupling or support is achieved as described above by the support frame 130.

The brush 200 is disposed to extend in one direction. In the illustrated embodiment, the brush 200 is formed to extend in a left-right direction. It will be understood that the extension direction is the same as that of the nozzle housing 50.

Accordingly, when the cleaner 1 moves forward, an area that the brush 200 sweeps may increase. Accordingly, the cleaning efficiency of the cleaner 1 may be improved.

The brush 200 may have any shape that is rotatable between the side frames 120. In the illustrated embodiment, the brush 200 has a circular cross section and a cylindrical shape extending in a left-right direction.

In the above embodiment, even when the rotation of the brush 200 is advanced, a distance between the center of the cross section and the outer circumference of the brush 200 may be kept constant to perform an efficient cleaning operation.

Support frames 130 are rotatably coupled to respective end portions in a direction in which the brush 200 extends, at left and right end portions in the illustrated embodiment, respectively. The support frame 130 is fixedly coupled to the side frame 120 to support the brush 200 so as to be rotatable as described above.

The removal member 300 and the support bar 430 of the gear part 400 are located adjacent to an outer circumference of the brush 200. The brush 200 may be relatively rotated with respect to the removal member 300. Accordingly, trash (H) such as hair collected by the brush 200 may be separated, and the detailed description thereof will be described later.

A main gear 410 is located on an outer circumference of each end portion in a direction in which the brush 200 extends, and on an outer circumference of each of the left and right end portions in the illustrated embodiment. The main gears 410 are gear-fitted to sub-gears 420 located adjacent to an outer circumference of the brush 200, respectively.

Accordingly, when the power part 600 is operated to rotate the brush 200, the main gear 410, the sub-gear 420, and the link part 500 connected thereto are rotated. As a result, the brush 200 and the removal member 300 may be operated by a single power part 600.

The brush 200 may be formed of a lightweight and high rigid material. In one embodiment, the brush 200 may be formed of a synthetic resin material such as reinforced plastic.

An adhesive member 210 is provided on an outer circumference of the brush 200.

The adhesive member 210 defines an outer circumferential surface of the brush 200. In other words, the adhesive member 210 is provided on the brush 200 to surround the outer circumferential surface of the brush 200.

The adhesive member 210 may be formed of a material having a predetermined roughness. This is to easily collect trash (H) such as hair staying on the floor surface (G) by frictional force and electrostatic attraction.

Furthermore, the adhesive member 210 may be formed of a material having a predetermined adhesive strength. This is to facilitate collection by pressing and adhering trash (H) such as hair staying on the floor surface (G).

In one embodiment, the adhesive member 210 may be formed of a fibrous material such as felt, blended fabric, linen, or bristle. Alternatively, the adhesive member 210 may be formed of a material such as rubber, latex, or acryl.

In this case, the roughness of a surface in a direction in which the adhesive member 210 is exposed to the outside, and in a direction toward a radial outer side with respect to the center of the brush 200 in the illustrated embodiment is preferably defined to be relatively higher.

As the brush 200 and the adhesive member 210 provided therein are rotated, trash (H) such as hair located on the floor surface (G) may adhere to the adhesive member 210. Trash (H) such as sticky hair may be rotated together with the brush 200 and the adhesive member 210, and then separated by the removal member 300. The detailed description thereof will be described later.

The removal member 300 separates trash adhered to the adhesive member 210 of the brush 200, particularly, trash (H), such as hair, from the adhesive member 210. The separated adhesive member 210 may be removed into the inside of the nozzle housing 50, and moved and collected into the dust bin 30 through the communication part 53.

The removal member 300 is located adjacent to the brush 200. In the illustrated embodiment, the removal member 300 is located at an upper portion of the brush 200.

The removal member 300 may be defined in a shape corresponding to the shape of an outer circumference of the brush 200. In the illustrated embodiment, the brush 200 has a cylindrical shape having a circular cross section, and the removal member 300 may be defined in an arc-shaped cross section having a predetermined curvature.

The removal member 300 is located at a radial outer side of the brush 200. In one embodiment, the center of the cross section of the removal member 300 may be disposed to have the same center as that of the brush 200.

The removal member 300 may extend in the same direction as the brush 200, in a left-right direction in the illustrated embodiment. The removal member 300 may have both end portions in an extending direction thereof, and left and right end portions in the illustrated embodiment coupled to the support frame 130 and the link part 500, respectively.

The removal member 300 may be formed of a lightweight and high rigid material. In one embodiment, the removal member 300 may be formed of a synthetic resin material such as reinforced plastic.

The removal member 300 may be relatively rotated with respect to the brush 200. In other words, the brush 200 is rotated using the power part 600 as a rotation axis. The removal member 300 revolves at a radial outer side of the brush 200 using a central axis of the brush 200 or the power part 600 as a rotation axis.

In this case, the removal member 300 may be rotated in the same direction as the rotation direction of the brush 200 or in a different direction. When the removal member 300 is rotated in the same direction as the rotation direction of the brush 200, trash (H) such as hair adhered to the adhesive member 210 may be removed.

Furthermore, the rotation speed of the removal member 300 may be higher than that of the brush 200. Accordingly, the removal member 300 may quickly remove trash (H) such as hair collected by the brush 200 from an radial outer side of the brush 200.

Such a difference in speed is achieved by the gear part 400 which will be described later.

In the illustrated embodiment, the removal member 300 includes an extension part 310, a coupling part 320, and a link connection part 330.

The extension part 310 extends between the plurality of side frames 120. In the illustrated embodiment, the extension part 310 is disposed to extend in a left-right direction.

The extension part 310 is located at a radial outer side of the brush 200. In other words, the extension part 310 is located to be spaced apart from an outer circumference of the brush 200 by a predetermined distance. The predetermined distance is preferably disposed to have a smaller diameter when the trash (H) such as hair is adhered to the adhesive member 210.

Accordingly, when the extension part 310 is rotated, trash (H) such as hair adhered to the adhesive member 210 may be pressed by the extension part 310 and removed from the adhesive member 210.

The extension part 310 may be disposed to partially cover an outer circumference of the brush 200. In the illustrated embodiment, the extension part 310 is defined in an arc shape whose cross section partially covers an outer circumference of the brush 200.

A curvature of the extension part 310, that is, a curvature of the extension part 310 with respect to the central axis of the brush 200 may be disposed to have the same curvature as that of the outer circumference of the brush 200.

The extension part 310 includes an inner surface 311.

The inner surface 311 may be defined as a surface facing the brush 200 on a surface of the extension part 310. In other words, the inner surface 311 may be defined as a surface facing a radial inner side on the surface of the extension part 310.

The inner surface 311 is disposed to partially surround the brush 200 or the adhesive member 210 provided in the brush 200 from a radial outer side thereof. The inner surface 311 is disposed to extend in an extension direction of the extension part 310, in a left-right direction in the illustrated embodiment.

Figure 6:
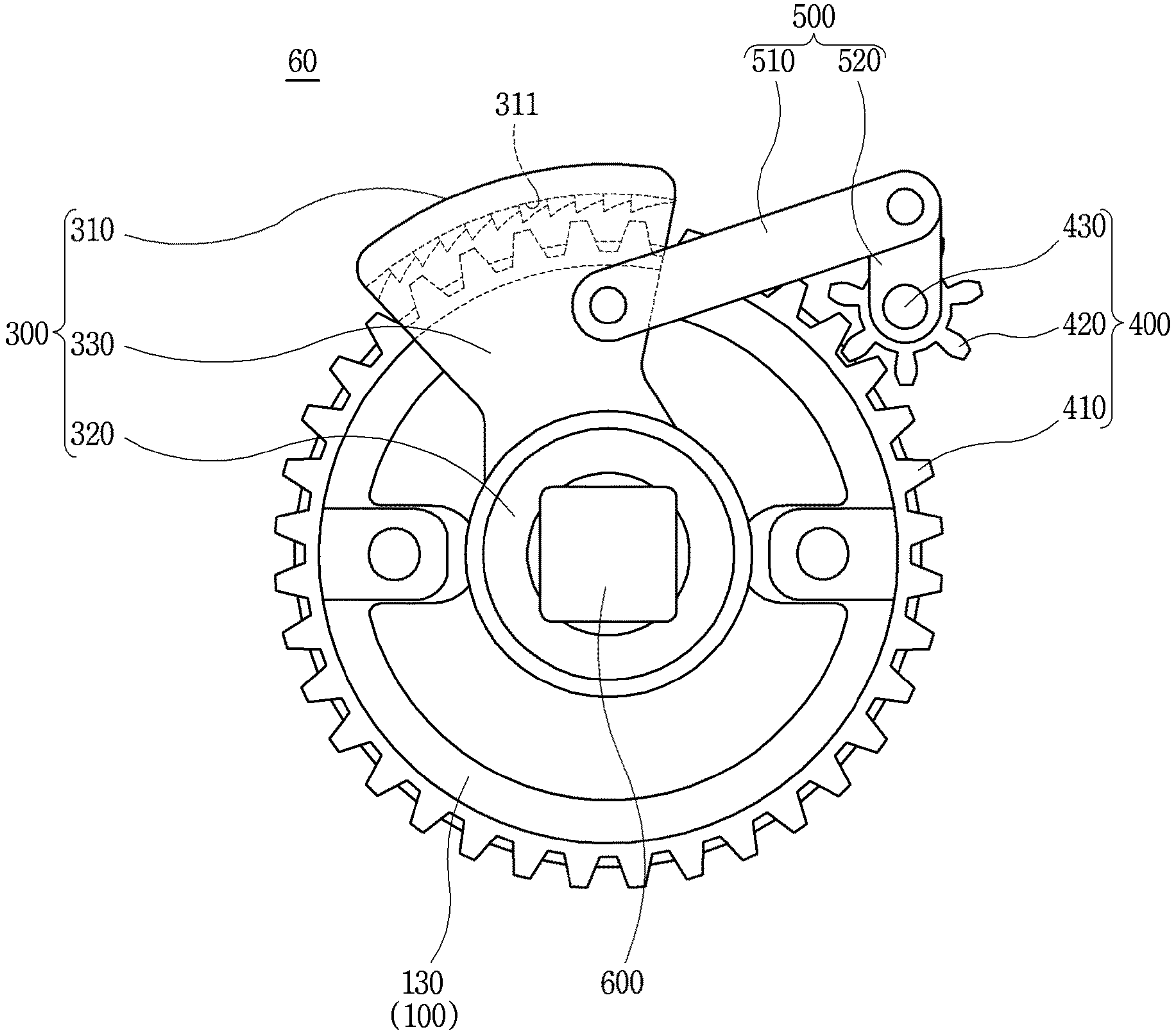
FIG. 6 is a side view illustrating a main brush and a removal member provided in the nozzle part of FIG. 3.

A member of the same material as the adhesive member 210 may be provided on the inner surface 311 (see FIG. 6). The member may be in contact with and in friction against the adhesive member 210. In addition, the member may press and push out trash such as hair (H) adhered to the adhesive member 210.

In other words, trash (H) such as hair adhered to the adhesive member 210 is easily separated from the adhesive member 210 by contact and friction between the member provided inside the extension part 310 and the adhesive member 210 or trash such as hair (H).

The coupling part 320 and the link connection part 330 extend from left and right end portions in the illustrated embodiment, in each direction in which the extension part 310 extend, respectively.

The coupling part 320 is a portion in which the removal member 300 is rotatably coupled to the brush 200. In other words, the coupling part 320 is a portion in which the removal member 300 is rotatably coupled to the side frame 120.

By the coupling part 320, even when the power part 600 is operated to rotate the brush 200, the removal member 300 may be rotated (i.e., revolved) with respect to the brush 200 regardless of the rotation.

The coupling part 320 is continuous with the extension part 310. The coupling part 320 is disposed to extend in a direction facing a radial inner side of the brush 200 from the extension part 310.

The coupling part 320 is continuous with the link connection part 330. The link connection part 330 is located between the extension part 310 and the coupling part 320.

A plurality of coupling parts 320 may be provided. The plurality of coupling parts 320 may be respectively located at each end portion in a direction in which the extension part 310 extends. In the illustrated embodiment, two coupling parts 320 are provided, and located at left and right end portions of the extension part 310, respectively.

The link connection part 330 is located between the coupling part 320 and the extension part 310.

The link connection part 330 is a portion where the removal member 300 is coupled to the link part 500. When the link part 500 performs link movement, the link connection part 330 performs link movement together with the link part 500.

Accordingly, the removal member 300 may be rotated by a predetermined distance in a clockwise or counterclockwise direction with respect to the central axis of the brush 200.

The link connection part 330 may be formed such that a width of its cross section is reduced in a direction facing a radial inner side. This is to prevent unnecessary interference from occurring while the removal member 300 is coupled to the brush 200 and the power part 600.

In order to couple the link connection part 330 and the link part 500, a coupling member such as a pin member may be provided.

Referring again to FIGS. 7 through 10, the adhesive member 210 provided in the nozzle part 60 according to an embodiment of the present disclosure and a member provided on an inner surface of the removal member 300 may be disposed to have a predetermined orientation.

Figure 7:
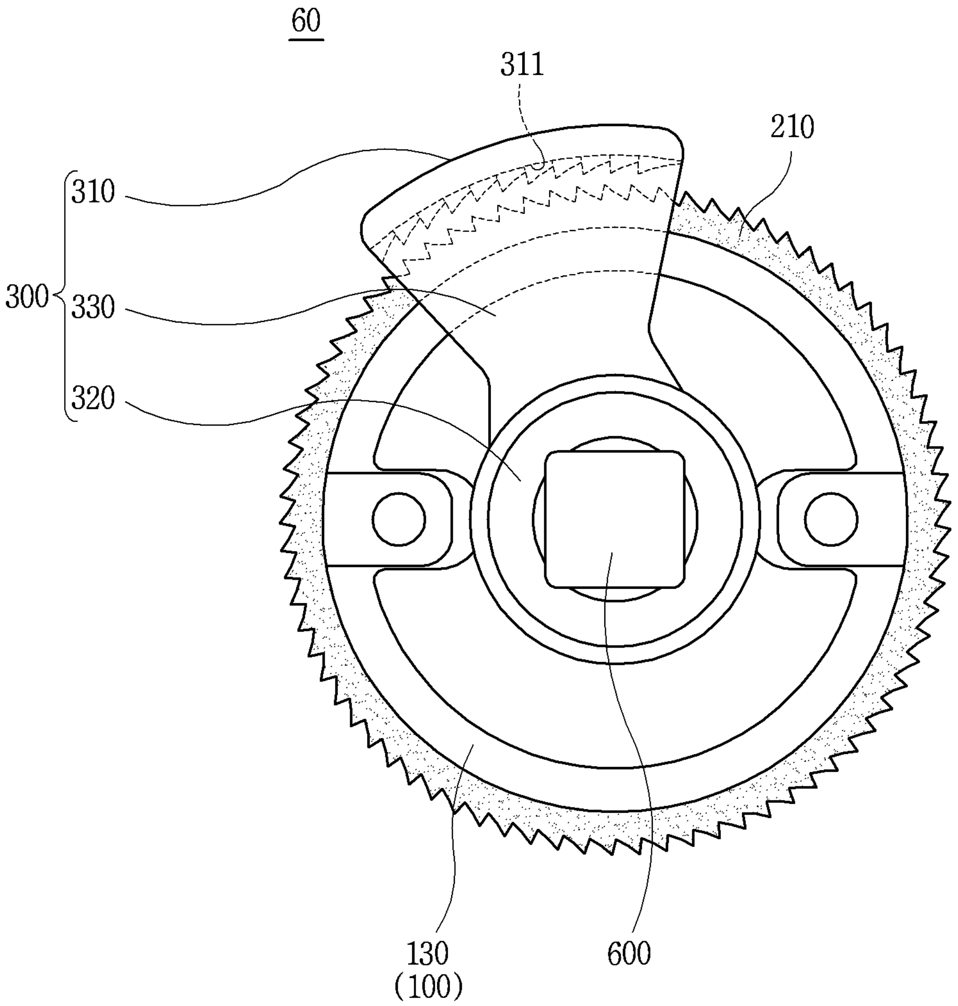
FIGS. 7 through 10 are side views illustrating various embodiments of directions of an adhesive member provided in the nozzle part of FIG. 3 and a member provided on an inner surface of a removal member.

In other words, in an embodiment illustrated in FIG. 7, the adhesive member 210 is defined such that a slope along a counterclockwise direction is lower than that along a clockwise direction. The inner surface 311 of the removal member 300 facing the adhesive member 210 is also defined such that a slope along the counterclockwise direction is lower than that along the clockwise direction.

Figure 8:
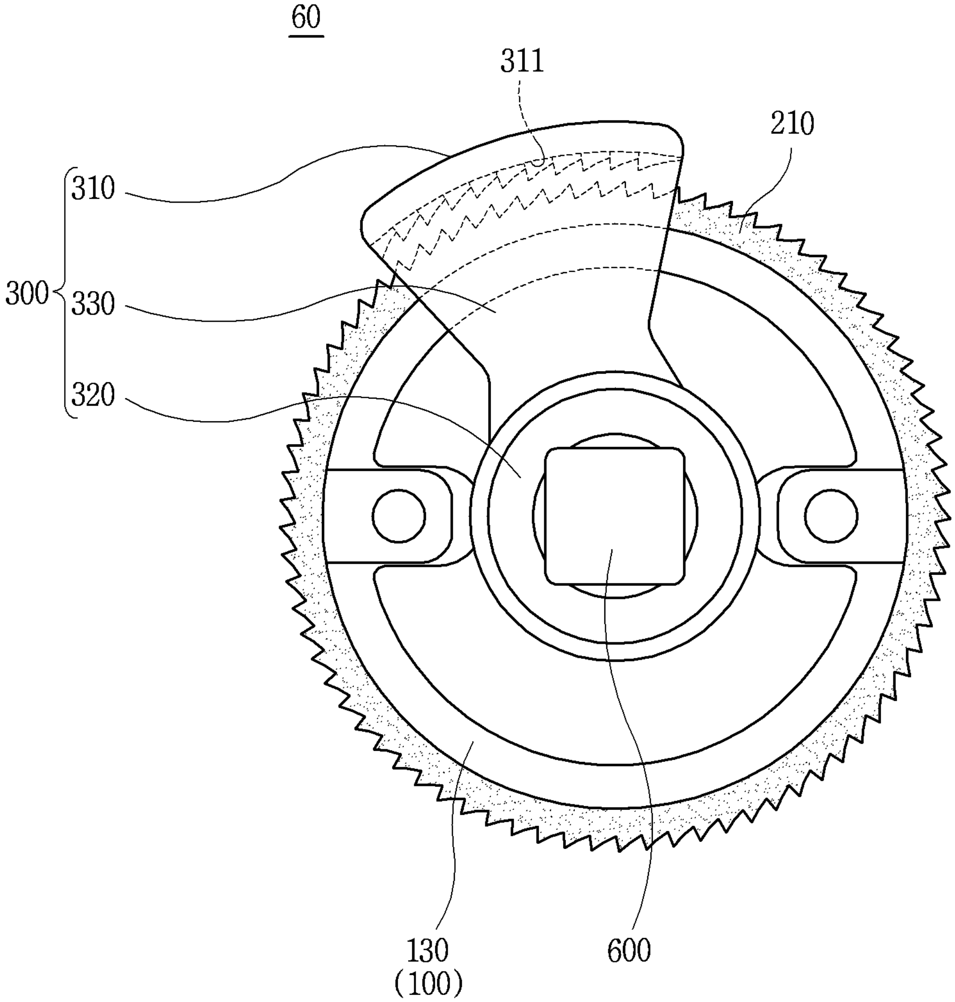

In an embodiment illustrated in FIG. 8, the adhesive member 210 is defined such that a slope along a clockwise direction is lower than that along a counterclockwise direction. On the contrary, on the inner surface 311 of the removal member 300 facing the adhesive member 210, a slope along the counterclockwise direction is defined lower than that along the clockwise direction.

Figure 9:
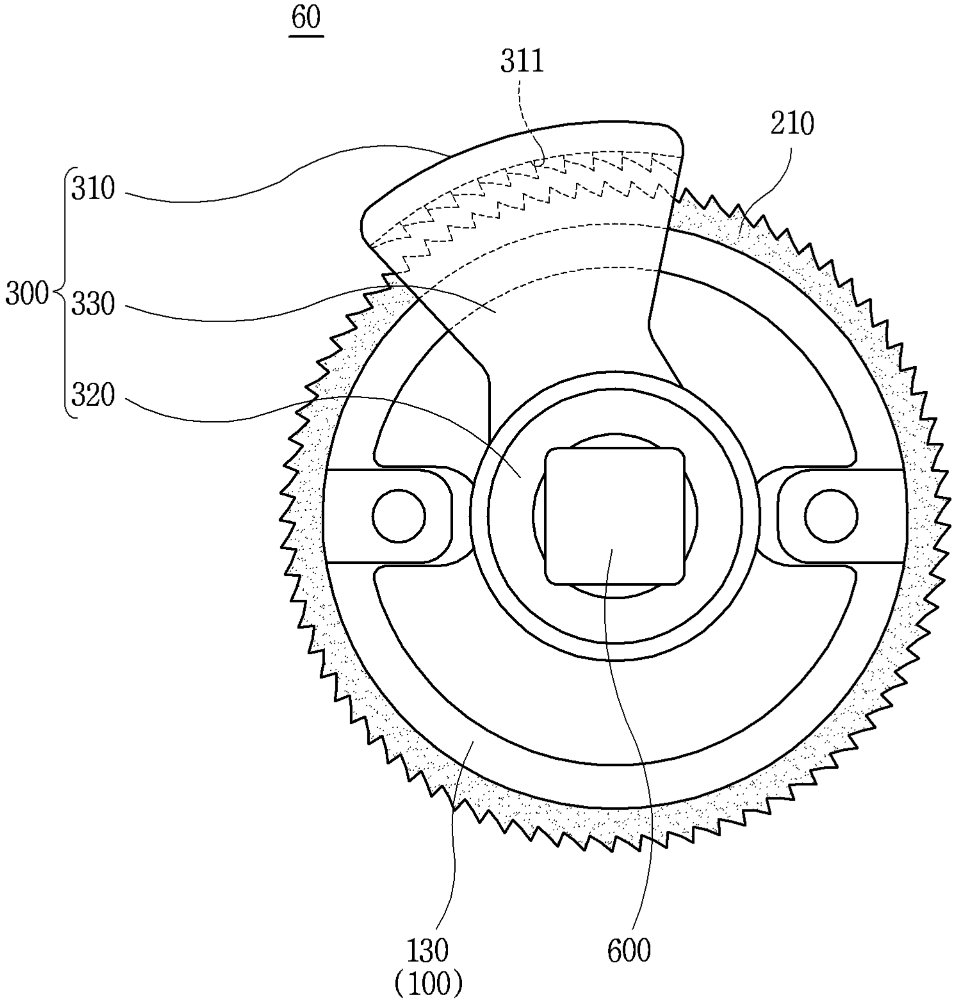

In an embodiment illustrated in FIG. 9, the adhesive member 210 is defined such that a slope along a counterclockwise direction is lower than that along a clockwise direction. On the contrary, the inner surface 311 of the removal member 300 facing the adhesive member 210 is defined such that a slope along the clockwise direction is lower than that along the counterclockwise direction.

Figure 10:
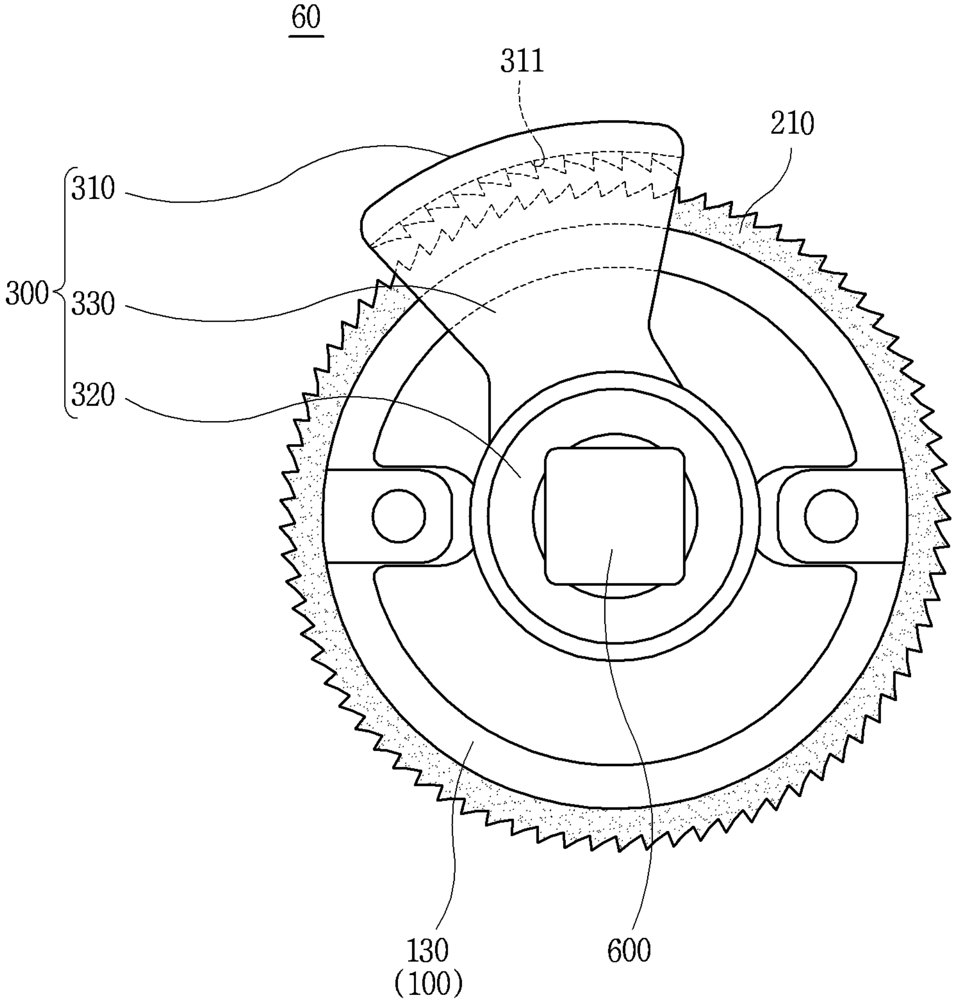
Figure 11:
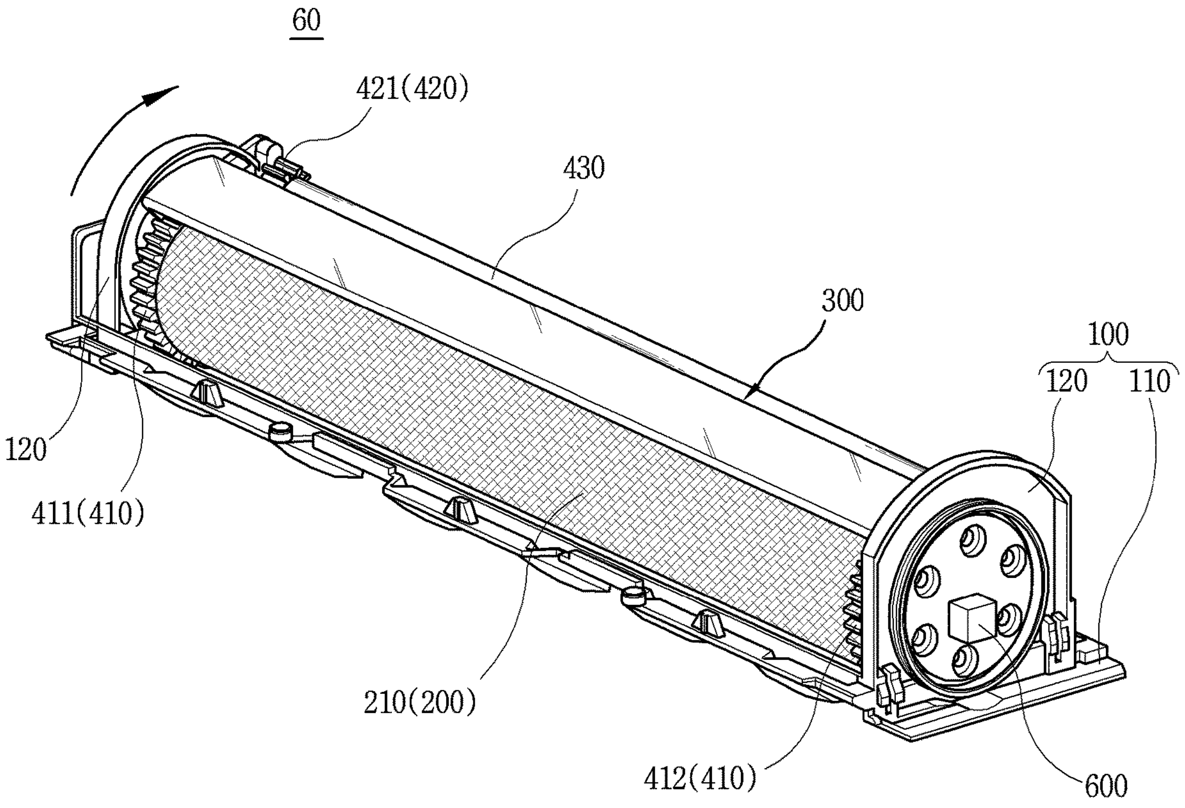
FIGS. 11 and 12 are perspective views illustrating an operation process of a main brush and a removal member provided in the nozzle part of FIG. 3.
Figure 12:
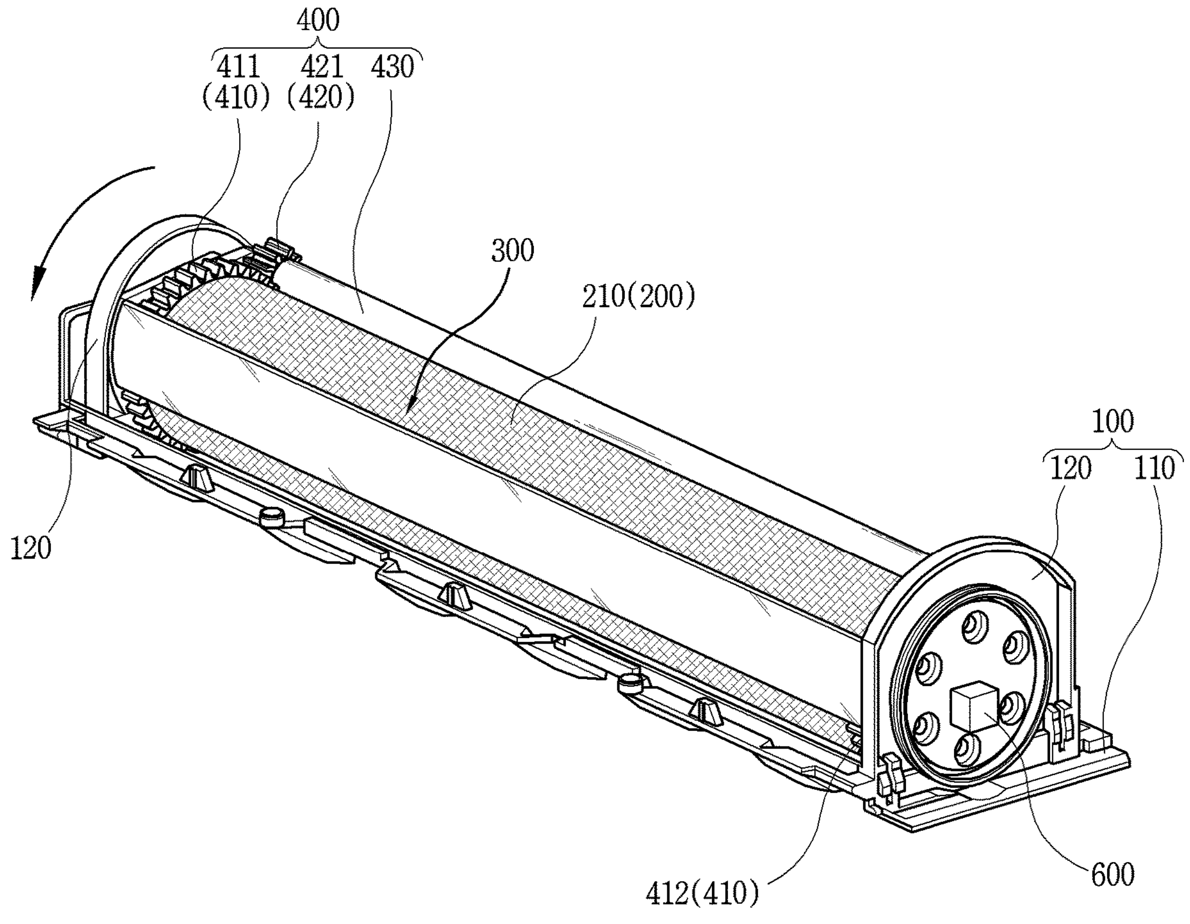

In an embodiment illustrated in FIG. 10, the adhesive member 210 is defined such that a slope along a clockwise direction is lower than that along a counterclockwise direction. The inner surface 311 of the removal member 300 facing the adhesive member 210 is also defined such that a slope along the counterclockwise direction is lower than that along the counterclockwise direction.

In other words, in the embodiment illustrated in FIGS. 7 and 10, the member provided on the inner surface 311 and the adhesive member 210 of the removal member 300 are defined to have the same orientation. Furthermore, in the embodiment shown in FIGS. 8 and 9, the member and the adhesive member 210 provided on the inner surface 311 of the removal member 300 are formed to have different directions.

The orientation may be determined according to an environment in which the cleaner 1 is driven and the user's intention.

For example, in order for the brush 200 to adhere to trash such as hair (H), a slope along the rotation direction may be defined to be more inclined than that along a direction opposite thereto.

In other words, in the embodiment illustrated in FIGS. 7 and 9, the brush 200 may be rotated in a counterclockwise direction. In addition, in the embodiment illustrated in FIGS. 8 and 10, the brush 200 may be rotated in a clockwise direction.

Therefore, trash such as hair (H) present on the floor surface (G) may be more effectively adhered since being adhere while being rubbed by a portion having a larger slope among the portions of the adhesive member 210.

In addition, in order for the removal member 300 to effectively separate trash such as hair (H) adhered to the brush 200, a slope along the rotational direction may be defined to be more inclined than that along a direction opposite thereto.

In other words, in the embodiment illustrated in FIGS. 7 and 8, when the removal member 300 is rotated in a counterclockwise direction, trash such as hair (H) adhered to the adhesive member 210 may be more effectively separated.

Likewise, in the embodiment illustrated in FIGS. 9 and 10, when the removal member 300 is rotated in a clockwise direction, trash such as hair (H) adhered to the adhesive member 210 may be more effectively separated.

In other words, it will be understood that the orientations of the member provided on the inner surface 311 of the removal member 300 and the adhesive member 210 may be changed according to an environment in which the cleaner 1 is used and a direction in which the cleaner 1 is driven.

Furthermore, the orientation may also be changed according to the structure of the cleaner 1, that is, the location of a portion where the brush 200 is exposed to the outside, and the direction in which trash such as hair (H) removed from the brush 200 is introduced into the dust bin 30 of the cleaner 1, and the like.

Meanwhile, as described above, the removal member 300 may reciprocate by a predetermined distance in a clockwise or counterclockwise direction along an outer circumferential surface of the brush 200.

Therefore, it will be understood that even when the orientation of the adhesive member 210 and the orientation of the member provided on the inner surface 311 of the removal member 300 are changed, the effect of the cleaner 1 according to the embodiment of the present disclosure will always be achieved above a predetermined level.

The gear part 400 transmits the rotation of the power part 600 to the removal member 300. Accordingly, both the brush 200 and the removal member 300 may be rotated by a single power part 600. In addition, by the gear part 400, the brush 200 and the removal member 300 may be rotated at different speeds.

The gear part 400 is connected to the power part 600. When the power part 600 is operated, the gear part 400 may be rotated.

The gear part 400 is connected to the link part 500. When the gear part 400 is rotated, the link part 500 and the removal member 300 connected to the link part 500 may be rotated.

A plurality of gear parts 400 may be provided. In the illustrated embodiment, the gear part 400 includes a main gear 410 provided in the brush 200, a sub-gear 420 located on an outer circumference of the brush 200, and located adjacent to the main gear 410, and a support bar 430 connected to the sub-gear 420.

The main gear 410 is coupled to the brush 200. The main gear 410 may be rotated together with the brush 200. In the illustrated embodiment, the main gear 410 is disposed to protrude radially outward from an outer circumference of the brush 200. The main gear 410 may be disposed to surround an outer circumference of the brush 200.

The main gear 410 may be provided in any form capable of being gear-fitted to the sub-gear 420.

A plurality of main gears 410 may be provided. The plurality of main gears 410 may be coupled to the brushes 200 at different positions in a direction in which the brush 200 extends, and rotated together with the brush 200.

In the illustrated embodiment, the main gear 410 includes a first main gear 411 located on the left side and a second main gear 412 located on the right side. The first main gear 411 is coupled to a left end portion of the brush 200. The second main gear 412 is coupled to a right end portion of the brush 200.

The main gear 410 may include a plurality of teeth parts. In other words, the main gear 410 may include a plurality of concave portions and a plurality of convex portions that are alternately arranged with each other along an outer circumference thereof.

At this time, the number of the plurality of concave portions and the plurality of convex portions provided in the main gear 410 may be greater than that of the plurality of concave portions and the plurality of convex portions provided in the sub-gear 420.

Accordingly, when the power part 600 rotates, the main gear 410 rotates slower than the sub-gear 420. In other words, for a predetermined time period, the number of rotations of the main gear 410 is less than that of the sub-gear 420.

Accordingly, when the power part 600 rotates, the brush 200 connected to the main gear 410 rotates slower than the removal member 300 connected to the sub-gear 420.

The sub-gear 420 is gear-fitted to the main gear 410. When the main gear 410 rotates, the sub-gear 420 gear-fitted to the main gear 410 also rotates. At this time, the sub-gear 420 rotates in a direction opposite to the rotation direction of the main gear 410.

In addition, as described above, the rotation speed of the sub-gear 420 is faster than that of the main gear 410.

The sub-gear 420 may be provided in any form capable of being gear-fitted to the main gear 410.

A plurality of sub-gears 420 may be provided. The plurality of sub-gears 420 may be gear-fitted to the plurality of main gears 410, respectively, at different positions in a direction in which the brush 200 extends from a radial outer side of the brush 200.

In the illustrated embodiment, the sub-gear 420 includes a first sub-gear 421 located on the left side and a second sub-gear 422 located on the right side.

The first sub-gear 421 is located adjacent to a left end portion of the brush 200, and gear-fitted to the first main gear 411. The second sub-gear 422 is located adjacent to a right end portion of the brush 200, and gear-fitted to the second main gear 412.

The sub-gear 420 may include a plurality of teeth parts. In other words, the sub-gear 420 may include a plurality of concave portions and a plurality of convex portions alternately arranged with each other along an outer circumference thereof.

At this time, the number of the plurality of concave portions and the plurality of convex portions provided in the sub-gear 420 may be less than that of the plurality of concave portions and the plurality of convex portions provided in the main gear 410.

In addition, as described above, accordingly, the rotation speed of the sub-gear 420 is defined faster than the rotation speed of the main gear 410.

The plurality of sub-gears 420 are respectively coupled to the support bar 430.

The support bar 430 is coupled to the plurality of sub-gears 420, respectively, to rotatably support the plurality of sub-gears 420.

The support bar 430 may be coupled to the first sub-gear 421 and the second sub-gear 422, respectively, to rotate together with the first sub-gear 421 and the second sub-gear 422.

The support bar 430 extends in a direction in which the brush 200 extends, in a left-right direction in the illustrated embodiment. Each end portion of the support bar 430 in an extension direction thereof is rotatably coupled to each side frame 120.

Accordingly, the first sub-gear 421 and the second sub-gear 422 may be stably rotated.

The link part 500 converts a rotational movement of the power part 600 into a translational movement. Accordingly, when the power part 600 is operated, the removal member 300 may be may be translated while being reciprocated in a clockwise or counterclockwise direction.

The link part 500 is connected to the sub-gear 420 of the gear part 400. When the gear part 400 rotates, the link part 500 may perform link movement.

The link part 500 is connected to the removal member 300. The removal member 300 may be translated by the link movement of the link part 500.

A plurality of link parts 500 may be provided. The plurality of link parts 500 may be coupled to the removal member 300 and the sub-gear 420, respectively, to enable link movement. In the illustrated embodiment, the link part 500 includes a main link 510 coupled to the removal member 300 and a sub-link 520 coupled to the sub-gear 420.

The main link 510 links the removal member 300 and the sub-link 520. The main link 510 is rotatably coupled to the removal member 300 and the sub-link 520, respectively.

The main link 510 is disposed to extend in one direction, in a front-rear direction in the illustrated embodiment. One end portion in a direction in which the main link 510 extends, a front end portion in the illustrated embodiment, is rotatably coupled to the link connection part 330 of the removal member 300. The other end in a direction in which the main link 510 extends, a rear end portion in the illustrated embodiment, is rotatably coupled to the sub-link 520.

The main link 510 may be rotatably coupled to the removal member 300 and the sub-link 520 by a pin member.

A plurality of main links 510 may be provided. The plurality of main links 510 may be connected to the link connecting parts 330 provided on both sides in a length direction of the removal member 300, respectively, and the sub-links 521, 522 located adjacent to the link connection parts 330, respectively.

In the illustrated embodiment, the main link 510 includes a first main link 511 provided on the left side and located adjacent to the first main gear 411 and a second main link provided on the right side and located adjacent to the second main gear 412.

The sub-link 520 links the main link 510 and the sub-gear 420. The sub-link 520 is rotatably coupled to the main link 510. In addition, the sub-link 520 is coupled to the sub-gear 420 to rotate together.

In other words, when the sub-link 520 rotates, the sub-gear 420 may also rotate. Accordingly, the rotation of the power part 600 and the main gear 410 may be transmitted to the sub-gear 420 through the link part 500.

The sub-link 520 may be coupled to the support bar 430. The sub-link 520 and the support bar 430 may rotate together.

Accordingly, when the brush 200 rotates, the sub-link 520 may rotate together with the sub-gear 420 and the support bar 430.

The sub-link 520 is disposed to extend in one direction, in a top-down direction in the illustrated embodiment. At this time, an extension length of the sub-link 520 may be smaller than that of the main link 510.

One end portion in a direction in which the sub-link 520 extends, an upper end in the illustrated embodiment, is rotatably coupled to the main link 510. The other end portion in a direction in which the sub-link 520 extends, a lower end in the illustrated embodiment, is coupled to the sub-gear 420.

The sub-link 520 and the main link 510 may be rotatably coupled by a pin member. Furthermore, the sub-link 520 may be coupled to the sub-gear 420 and the support bar 430 by a fastening member (not shown).

A plurality of sub-links 520 may be provided. The plurality of sub-links 520 may be connected to first and second sub-gears 421, 422 and support bars 430, respectively, provided on both sides of the removal member 300 in a length direction.

In the illustrated embodiment, the sub-link 520 includes a first sub-link 521 provided on the left side and coupled to the first main link 511 and the first sub-gear 421, and a second sub-link 521 provided on the right side and coupled to the second main link 512 and the second sub-gear 522.

The power part 600 generates power for rotating the brush 200 and the removal member 300. The power part 600 is connected to the main gear 410 of the gear part 400. The power part 600 and the main gear 410 may rotate together.

The power part 600 may be provided in any form capable of controlling rotation or non-rotation, rotation direction, rotation speed or the like thereof by an input of an electrical signal. In one embodiment, the power part 600 may be provided with an electric motor.

The power part 600 is electrically connected to an external power source (not shown) and a controller (not shown). Power for operating the power part 600 may be supplied from the power source (not shown). In addition, a control signal for controlling the rotation or non-rotation, rotation direction, rotation speed or the like of the power part 600 may be applied from the controller (not shown).

The power part 600 is connected to the brush 200. When the power part 600 is operated, the brush 200 may be rotated. Accordingly, the main gear 410 coupled to the brush 200 may also rotate.

The power part 600 may be located adjacent to either one of the first main gear 411 and the second main gear 412. In the illustrated embodiment, a singular number of the power part 600 is provided and located adjacent to the second main gear 412 located on the right side.

The power part 600 may be coupled to the side frame 120 of the frame 100. Accordingly, the power part 600 may be stably supported.

The detailed description of a process of rotating the brush 200 and the removal member 300 as the power part 600 is operated will be described later.

(2) Description of Operation Process of Nozzle Part 60

In the nozzle part 60 according to an embodiment of the present disclosure, the brush 200 and the removal member 300 may be rotated by a single number of the power part 600 through the foregoing configuration.

Hereinafter, an operation process of the nozzle part 60 according to an embodiment of the present disclosure will be described in detail with reference to FIGS. 11 through 14.

The power part 600 is electrically connected to a power source (not shown) and a controller (not shown) by a member such as an electric wire. When power and control signals are applied to the power part 600, the power part 600 is rotated.

The power part 600 is coupled to the brush 200. Therefore, when the power part 600 rotates, the brush 200 also rotates. At this time, the main gear 410 is coupled to each end portion in a direction in which the brush 200 extends, in a left-right direction in the illustrated embodiment. The main gear 410 is also rotated together with the brush 200.

The main gear 410 is gear-fitted to the sub-gear 420 located adjacent thereto. Therefore, when the main gear 410 rotates, the sub-gear 420 also rotates. At this time, it will be understood that the rotation directions of the main gear 410 and the sub-gear 420 are opposite to each other.

Accordingly, the link part 500 connected to the sub-gear 420 is also rotated. Since the link part 500 is link-coupled to the removal member 300, the removal member 300 reciprocates by the rotation of the link part 500.

The removal member 300 rotates alternately in a direction the same as and different from the rotation direction of the brush 200.

Figure 13:
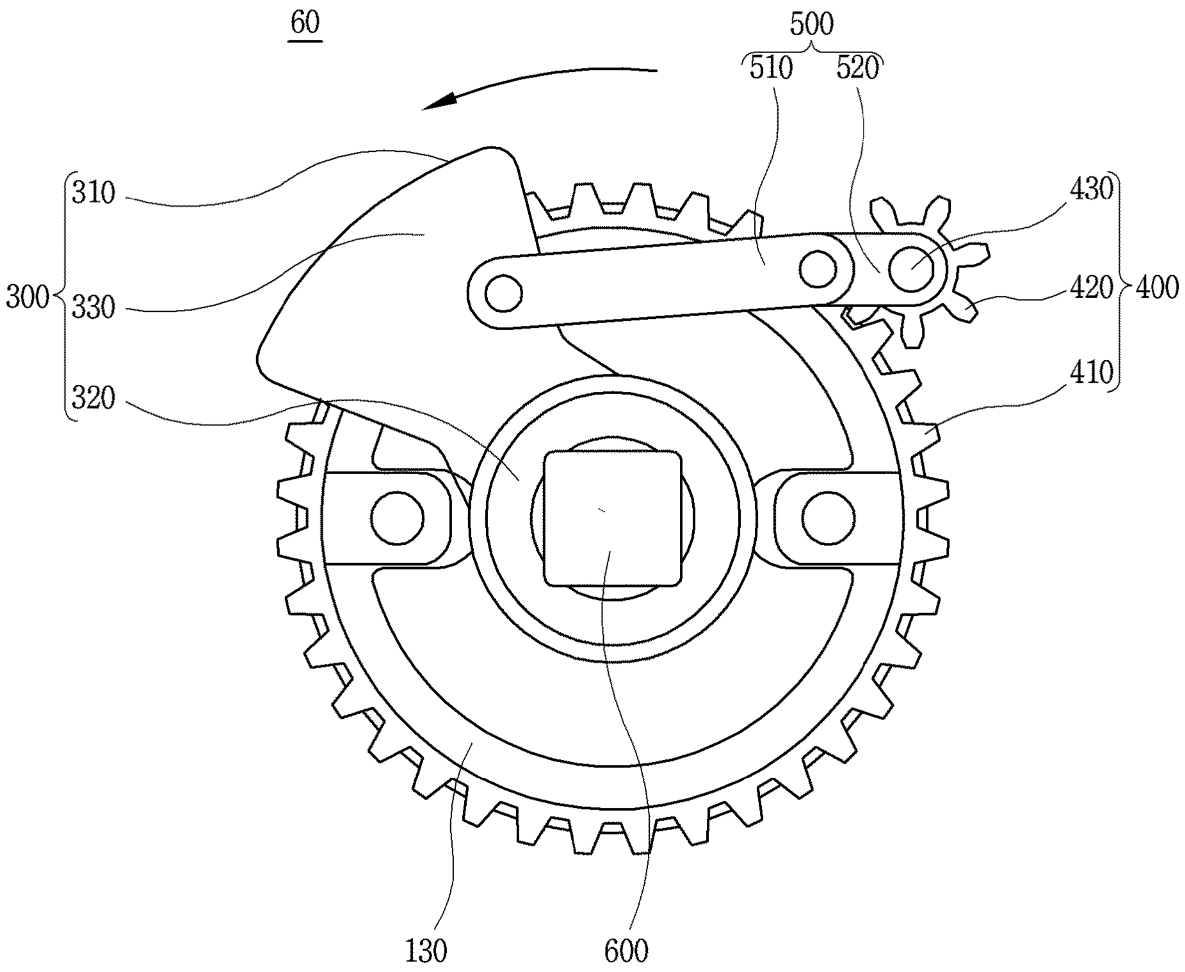
FIGS. 13 and 14 are side views illustrating an operation process of a main brush and a removal member provided in the nozzle part of FIG. 3.
Figure 14:
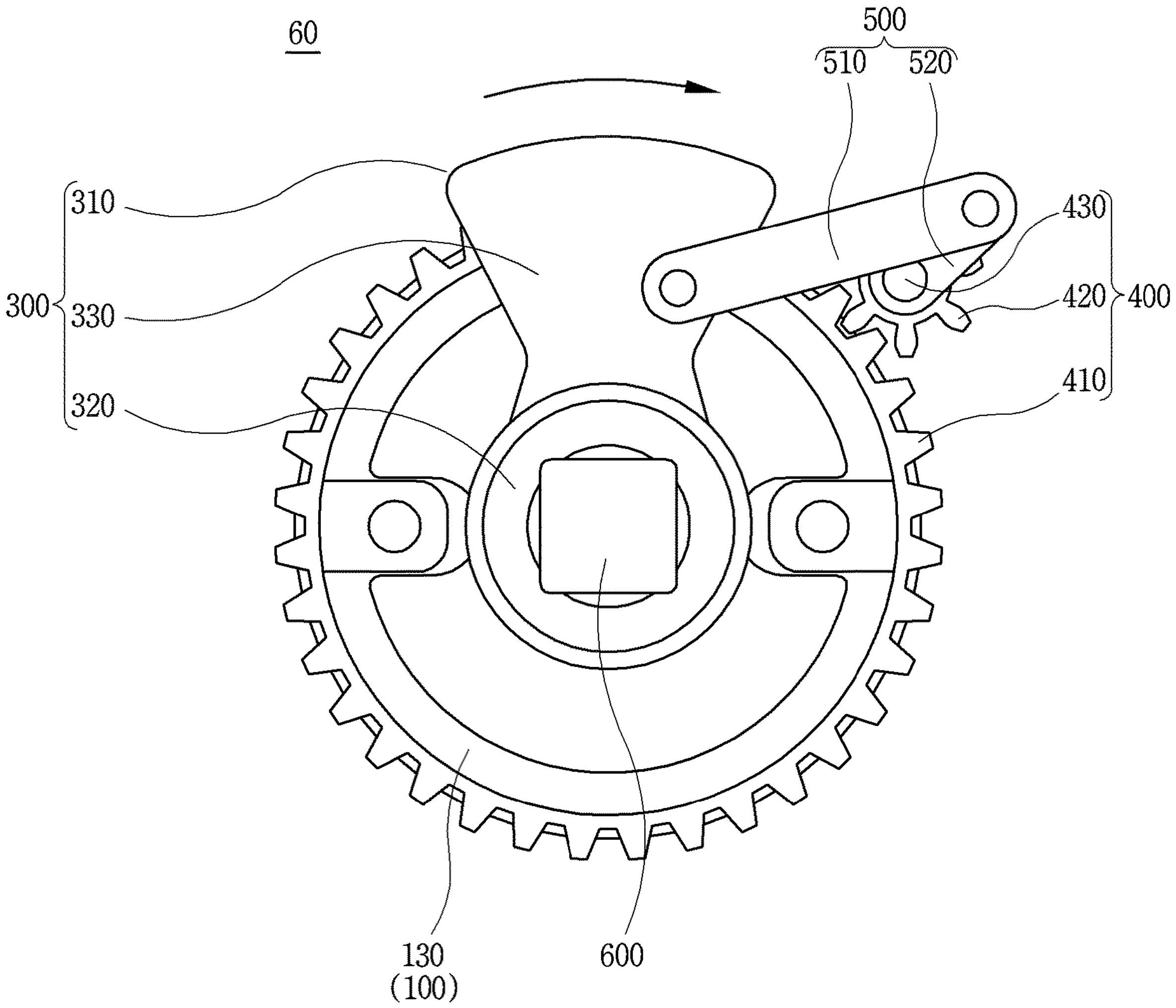

In other words, in the embodiment shown in FIG. 13, the removal member 300 is rotated counterclockwise. In addition, in the embodiment shown in FIG. 14, the removal member 300 is rotated clockwise.

As the operation of the power part 600 continues, the removal member 300 repeats the rotation. Accordingly, trash (H) such as hair adhered to the adhesive member 210 of the brush 200 may be pressed by the removal member 300 and removed from the brush 200.

4. Description of Process in which Trash (H) Such as Hair is Collected and Separated by Nozzle Part 60 According to Embodiment of Present Disclosure and Cleaner 1 Including the Same The nozzle part 60 according to an embodiment of the present disclosure and the cleaner 1 including same may effectively collect trash (H) such as hair remaining in the driving environment.

In addition, the collected trash (H) such as hair may be easily separated and accommodated in the dust bin 30, even when the user does not perform an additional operation.

Hereinafter, with reference to FIG. 15, a process in which trash (H) such as hair is collected and separated by the nozzle part 60 according to an embodiment of the present disclosure and the cleaner 1 including the same will be described in detail.

Figure 15:
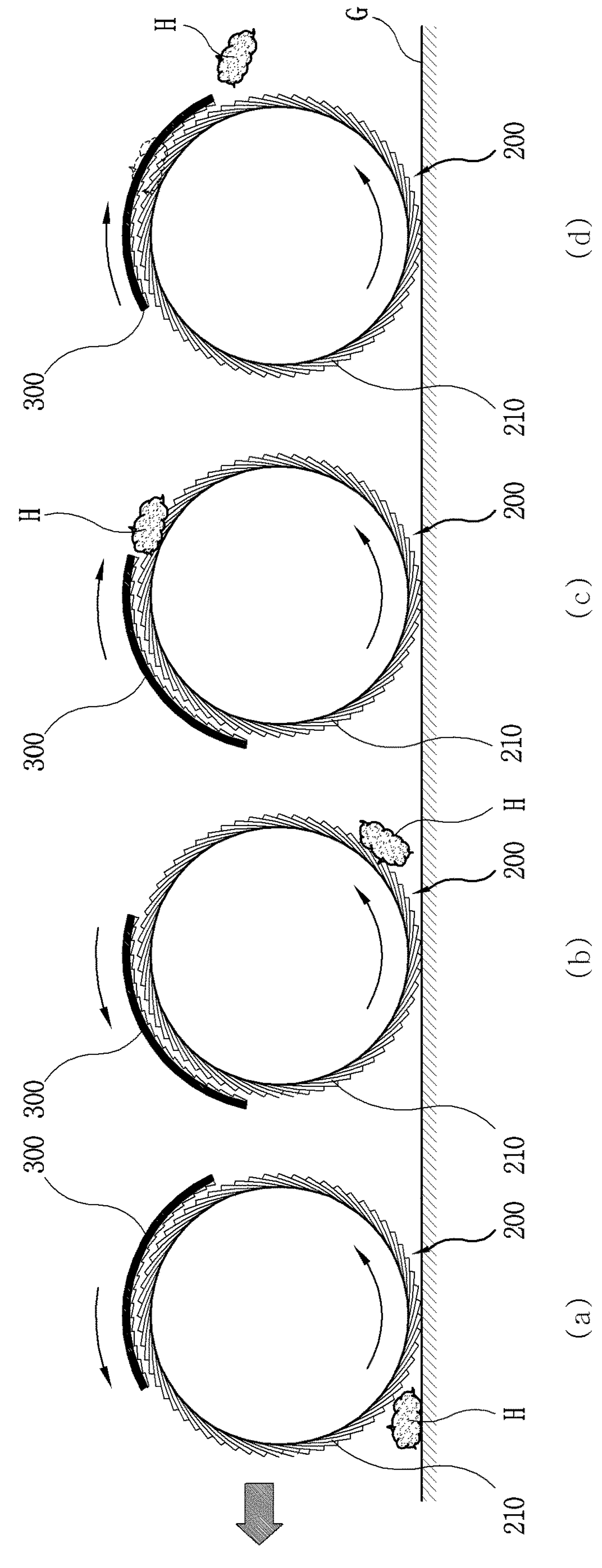
FIG. 15 is a conceptual view illustrating a process of collecting trash such as hair by a cleaner according to an embodiment of the present disclosure.

Referring to (a) of FIG. 15, it is illustrated that the brush 200 and the removal member 300 of the nozzle part 60 provided in the cleaner 1 driven on the floor surface (G) toward the left side.

It will be understood that the removal member 300 is rotated according to the operation of the power part 600, but rotated at a faster speed than the brush 200.

At this time, the brush 200 may be rotated in a counterclockwise direction, so that the cleaner 1 may be easily driven.

For convenience of understanding, the removal member 300 is also shown to be rotated in a counterclockwise direction, which is the same direction as the rotation direction of the brush 200. However, as described above, it will be understood that since the rotation speed of the removal member 300 is faster than that of the brush 200, the content which will be described later may be applied even if the removal member 300 is rotated in a direction opposite to the brush 200.

Trash (H) such as hair is positioned on the floor surface (G) before the cleaner 1 passes therethrough.

Referring to (b) of FIG. 15, it is illustrated a state in which the cleaner 1 is driven and trash (H) such as hair present on the floor surface (G) is collected by the brush 200.

As described above, the brush 200 includes an adhesive member 210 surrounding an outer circumference thereof. The adhesive member 210 may be formed of a fiber material having a high roughness such as felt.

Trash (H) such as hair adhered to the adhesive member 210 is moved in the same direction as the brush 200, that is, in a counterclockwise direction, as the brush 200 is rotated. Accordingly, trash (H) such as hair is moved to a rear side of the brush 200 through the floor surface (G), that is, to the right side in the illustrated embodiment.

Meanwhile, the removal member 300 is still moved in the same direction as the brush 200. As described above, the illustrated embodiment is for convenience of understanding, and in the above state, the removal member 300 may be moved in a different direction.

Referring to (c) of FIG. 15, it is illustrated a state immediately before the removal member 300 presses trash (H) such as hair adhered to the adhesive member 210.

In this state, the brush 200 is still rotated in one direction, that is, in a counterclockwise direction. Therefore, the trash (H) such as hair is further moved compared to the state shown in (b) of FIG. 15.

Referring to (d) of FIG. 15, it is illustrated a state in which trash (H) such as hair adhered to the adhesive member 210 is removed by the removal member 300.

In this state, the brush 200 is continuously rotated in the same direction as the foregoing direction, that is, in a counterclockwise direction. In addition, the removal member 300 is continuously rotated in a direction opposite to that of the brush 200, that is, in a clockwise direction.

Therefore, trash (H) such as hair adhered to the adhesive member 210 is pressed by the removal member 300 rotated in a direction opposite to the rotation direction of the brush 200, and separated and removed from the adhesive member 210.

At this time, as the brush 200 is rotated in a direction opposite to the rotation direction of the removal member 300, an amount of impact applied by the removal member 300 to trash (H) such as hair may increase. As a result, trash (H) such as hair may be separated more easily and effectively from the adhesive member 210.

Through the above process, trash (H) such as hair is removed toward a rear side of the brush 200, that is, an inner space of the nozzle housing 50.

As described above, the inner space of the nozzle housing 50 communicates with an inner space of the body part 10 and the dust bin 30 through the communication part 53. Furthermore, at least one of the inner space of the body part 10, the dust bin 30, and the communication part 53 is provided with a member (not shown) for sucking trash (H) such as the removed hair.

Accordingly, the removed trash (H) such as hair is collected in the dust bin 30 through the communication part 53 and the inner space of the body part 10.

As a result, the nozzle part 60 according to an embodiment of the present disclosure and the cleaner 1 including the same may effectively collect trash (H) such as hair that is difficult to remove from the floor surface (G).

In addition, the collected trash (H) such as hair may be easily separated from the brush 200 by the removal member 300 and accommodated in the dust bin 30.

Moreover, the above process may be achieved by rotating the brush 200 and the removal member 300 at different speeds by a single number of the power part 600.

Hereinafter, with reference to FIG. 16, a process in which trash (H) such as hair is collected and pressed by the nozzle part 60 according to an embodiment of the present disclosure and the cleaner 1 including the same will be described in detail.

Figure 16:
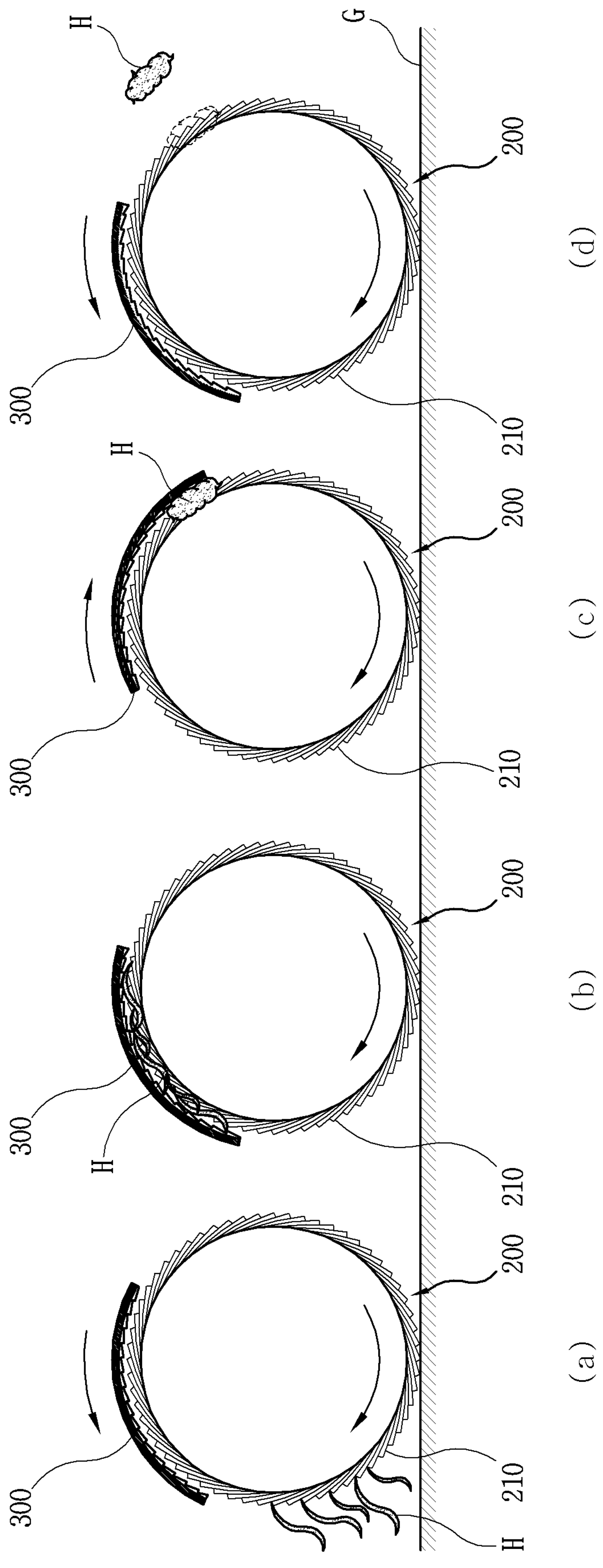
FIG. 16 is a conceptual view illustrating a process of pressing and collecting trash such as hair by a cleaner according to an embodiment of the present disclosure.

Referring to (a) of FIG. 16, it is illustrated that the brush 200 and the removal member 300 of the nozzle part 60 provided in the cleaner 1 driven on the floor surface (G) toward the left side. It will be understood that the removal member 300 is rotated according to the operation of the power part 600, but rotated at a faster speed than the brush 200.

At this time, the brush 200 is rotated in a clockwise direction, and the removal member 300 is rotated in a counterclockwise direction. However, the illustrated embodiment is for convenience of understanding, and in the above state, the removal member 300 may be moved in a different direction.

The cleaner 1 is driven, and trash (H) such as hair present on the floor surface (G) is collected by the brush 200.

The brush 200 includes an adhesive member 210 surrounding an outer circumference thereof. The adhesive member 210 may be formed of a fiber material having a high roughness such as felt.

Trash (H) such as hair adhered to the adhesive member 210 is moved in the same direction as the brush 200, that is, in a clockwise direction, as the brush 200 is rotated. Accordingly, trash (H) such as hair is moved toward the removal member 300.

Referring to (b) of FIG. 16, it is illustrated a state in which trash (H) such as hair is introduced into a space between the adhesive member 210 and the removal member 300.

In this state, the brush 200 is still rotated in one direction, that is, in a clockwise direction. Therefore, trash (H) such as hair is further moved compared to the state illustrated in (a) of FIG. 16.

Referring to (c) of FIG. 16, it is illustrated a state in which trash (H) such as hair adhered to the adhesive member 210 is pressed by the removal member 300.

In this state, the brush 200 is continuously rotated in one direction, that is, in a clockwise direction. However, the removal member 300 is rotated in the same direction as the rotation direction of the brush 200, in a clockwise direction in the illustrated embodiment. In other words, in the state illustrated in (b) of FIG. 16, the removal member 300 is moved to the end in a counterclockwise direction.

Therefore, the trash (H) such as hair is further moved compared to the state shown in (b) of FIG. 16. At the same time, trash (H) such as hair is pressed and collected by the removal member 300.

As described above, the adhesive member 210 and a member provided on an inner surface of the removal member 300 may be disposed to have a predetermined direction. In the illustrated embodiment, the adhesive member 210 and a member provided on an inner surface of the removal member 300 are disposed to have the same orientation.

However, the illustrated embodiment is for convenience of understanding, and it will be understood that the orientations of the adhesive member 210 and the member provided on an inner surface of the removal member 300 may be disposed in opposite directions.

In addition, it will be understood that the direction and position in which trash (H) such as hair is collected may be changed according to the orientations of the adhesive member 210 and the member provided on an inner surface of the removal member 300.

Referring to (d) of FIG. 16, it is illustrated a state in which trash (H) such as collected hair is removed by a suction member (not shown) of the cleaner 1.

As described above, the inner space of the nozzle housing 50 communicates with an inner space of the body part 10 and the dust bin 30 through the communication part 53. Furthermore, at least one of the inner space of the body part 10, the dust bin 30, and the communication part 53 is provided with a member (not shown) for sucking trash (H) such as the removed hair.

Trash (H) such as hair collected at one side of the adhesive member 210 is separated and removed from the adhesive member 210 by a suction member (not shown) of the cleaner 1. At this time, trash (H) such as hair may be collected to increase a surface area and volume thereof, and as a result, more easily and effectively separated from the adhesive member 210.

Through the above process, trash (H) such as hair is removed toward a rear side of the brush 200, that is, an inner space of the nozzle housing 50. Accordingly, the removed trash (H) such as hair is collected in the dust bin 30 through the communication part 53 and the inner space of the body part 10.

As described in FIG. 15, as a result, it will be understood that the nozzle part 60 effectively collects trash (H) such as hair that is difficult to remove from the floor surface (G), and the collected trash (H) such as hair can be easily separated from the brush 200 and accommodated in the dust bin 30.

Though the present invention is described with reference to preferred embodiments, various modifications and improvements will become apparent to those skilled in the art without departing from the concept and scope of the present invention as defined in the following claims.

1: Cleaner
10: Body part
20: Driving part
30: Dust bin
40: Sensor part
50: Nozzle housing
51: Outer housing
52: Inner housing
53: Communication part
60: Nozzle part
100: Frame
110: Lower frame
120: Side frame
130: Support frame
200: Brush
210: Adhesive member
300: Removal member
310: Extension part
311: Inner surface
320: Coupling part
330: Link connection part
400: Gear part
410: Main gear
411: First main gear
412: Second main gear
420: Sub-gear
421: First sub-gear
422: Second sub-gear
430: Support bar
500: Link part
510: Main link
511: First main link
512: Second main link
520: Sub-link
521: First sub-link
522: Second sub-gear
600: Power part
H: Trash such as hair
G: Floor surface

The invention claimed is:

1. A cleaner, comprising:

a frame;

a roller rotatably coupled to the frame to extend in an extension direction, and including an adhesive material provided at an outer circumference thereof;

a removal assembly extending in the extension direction of the roller, located at a section of the outer circumferential of the roller, and coupled to the frame so as to be rotatable with respect to the roller;

at least one main gear coupled to the roller to rotate together with the roller;

at least one sub-gear rotatably coupled to the frame, and gear-fitted to the main gear; and a link coupled to the at least one sub-gear and the removal assembly, respectively, wherein the removal assembly is rotated along the outer circumference of the roller.

2. The cleaner of claim 1, wherein the removal assembly comprises:

an extension wall extending along the extension direction of the roller and adjacent to the outer circumference of the roller at a radial outer side thereof; and a coupling frame located at an end of the extension wall, and rotatably coupled to the frame, wherein the extension wall of the removal assembly is rotated along the outer circumference of the roller.

3. The cleaner of claim 2, wherein the extension wall is located adjacent to the outer circumference of the roller.

4. The cleaner of claim 2, wherein the adhesive material has a predetermined roughness, and a surface of the extension wall facing the outer circumference of the roller includes a material with a roughness matching that of the adhesive material.

5. The cleaner of claim 1, wherein the link and the removal assembly perform movement when the at least one sub-gear is rotated.

6. The cleaner of claim 1, wherein:

the at least one main gear comprises:

a first main gear located at a first end the roller; and a second main gear located at a second end of the roller, and the at least one sub-gear comprises:

a first sub-gear gear-fitted to the first main gear; and a second sub-gear gear-fitted to the second main gear.

7. The cleaner of claim 1, wherein the link comprises:

a main link rotatably coupled to the removal assembly; and a sub-link rotatably coupled to the main link, and coupled to the sub-gear to rotate together therewith.

8. The cleaner of claim 1, wherein the main gear includes more teeth than the sub-gear; and the main gear is rotated at a lower speed than the sub-gear.

9. The cleaner of claim 1, comprising:

a motor coupled to the roller to rotate the roller, wherein the motor provides force to one end of the roller.

10. The cleaner of claim 1, wherein the removal assembly is reciprocated by a predetermined distance along the outer circumference of the roller.

11. The cleaner of claim 10, wherein:

an object adhered to the adhesive material is moved in a first circumferential direction along the outer circumference of the roller by the rotation of the roller, and the removal assembly is rotated in a second circumferential direction different from the first circumferential direction in which the roller is rotated to press and to remove the object from the adhesive material.

12. The cleaner of claim 11, further comprising:

a dust bin detachably provided to communicate with the frame, wherein the removed object is introduced into the dust bin after being removed from the roller by the removal assembly.

13. A cleaner, comprising:

a body;

a nozzle housing detachably coupled to the body; and a nozzle assembly accommodated in the nozzle housing, and partially exposed to an outside of the nozzle housing, wherein the nozzle assembly comprises:

a frame coupled to the nozzle housing;

a roller rotatably coupled to the frame to extend in an axial direction, and including an adhesive material on an outer circumference thereof;

a removal assembly extending in the axial direction of the roller, and rotatably coupled to the frame with respect to the roller;

a main gear coupled to the roller to rotate together with the roller;

a sub-gear rotatably coupled to the frame, and gear-fitted to the main gear; and a link coupled to the sub-gear and the removal assembly, respectively, and wherein the removal assembly comprises:

an extension wall extending along the axial direction of the roller, a cross section of being defined in an arc shape to partially cover the outer circumference of the roller.

14. The cleaner of claim 13, wherein the extension wall of the removal assembly covers an area of less than half of an area of the outer circumference of the roller.

15. The cleaner of claim 13, wherein the extension wall has a rotation axis that is coaxial with a rotational axis of the roller, and a curvature of an inner surface of the extension wall matches a curvature of the outer circumference of the roller.

16. The cleaner of claim 13, wherein the extension wall of the removal assembly of the nozzle assembly is located adjacent to the outer circumference of the roller.

17. The cleaner of claim 13, wherein the removal assembly of the nozzle assembly further comprises a coupling frame that is continuous with an end of the extension wall in the axial direction of the roller and is rotatably coupled to the roller.

18. The cleaner of claim 17, wherein the nozzle assembly includes a pair of the coupling frames, and the pair of the coupling frames are respectively provided at each end of the extension wall in the axial direction of the roller.

19. A robot cleaner, comprising:

a body;

a nozzle housing detachably coupled to the body; and a nozzle assembly accommodated in the nozzle housing, and partially exposed to an outside of the nozzle housing, wherein the nozzle assembly comprises:

a frame coupled to the nozzle housing;

a roller rotatably coupled to the frame to extend in an axial direction, and including an adhesive material on an outer circumference thereof;

a removal assembly extending in the axial direction of the roller, located at a radial outer side of the roller, and coupled to the frame so as to be rotatable with respect to the roller;

a main gear coupled to the roller to rotate together with the roller;

a sub-gear rotatably coupled to the frame, and gear-fitted to the main gear; and a link coupled to the sub-gear and the removal assembly, respectively, and wherein the removal assembly is reciprocated by a predetermined distance in the outer circumferential direction of the roller when the roller is rotated.

20. The robot cleaner of claim 19, wherein the removal assembly is reciprocated along a portion of the outer circumference of the roller accommodated inside the nozzle housing.

21. The robot cleaner of claim 19, wherein the link is configured to rotate the removal assembly based on a rotation of the main gear and at a faster speed than the roller.

22. The robot cleaner of claim 19, wherein the roller is rotated in a clockwise or counterclockwise direction, and the removal assembly is reciprocated in a clockwise or counterclockwise direction by the predetermined distance along the outer circumferential of the roller.

23. A cleaner, comprising:

a body;

a nozzle housing detachably coupled to the body; and a nozzle assembly accommodated in the nozzle housing, and partially exposed to an outside of the nozzle housing, wherein the nozzle assembly comprises:

a frame coupled to the nozzle housing;

a roller rotatably coupled to the frame to extend in an axial direction, and including an adhesive material at an outer circumference thereof;

a removal assembly extending in the axial direction of the roller, located at a radial outer side of the roller, and link-coupled to the roller;

a main gear coupled to the roller to rotate together with the roller;

a sub-gear rotatably coupled to the frame, and gear-fitted to the main gear; and at least one link coupled to the sub-gear and the removal assembly, respectively, and wherein the removal assembly revolves along the outer circumference of the roller when the roller is rotated.

24. The cleaner of claim 23, wherein the at least one link comprises:

a main link connected to the removal assembly; and a sub-link connected to the main link and the sub-gear, respectively, and wherein a length of the main link is greater than that of the sub-link.

* * * * *